US006679243B2

(12) United States Patent
Sung

(10) Patent No.: US 6,679,243 B2
(45) Date of Patent: Jan. 20, 2004

(54) BRAZED DIAMOND TOOLS AND METHODS FOR MAKING

(76) Inventor: Chien-Min Sung, No. 4, Lane 32, Chung-Cheng Rd., Tansui, Taipei County (TW), 23911

( * ) Notice: Subject to any disclaimer, the term of this patent is extended or adjusted under 35 U.S.C. 154(b) by 67 days.

(21) Appl. No.: 09/935,204

(22) Filed: Aug. 22, 2001

(65) Prior Publication Data

US 2002/0077054 A1 Jun. 20, 2002

Related U.S. Application Data

(63) Continuation-in-part of application No. 09/399,573, filed on Sep. 20, 1999, now Pat. No. 6,286,498, which is a continuation-in-part of application No. 08/835,117, filed on Apr. 4, 1997, now Pat. No. 6,039,641, and a continuation-in-part of application No. 08/832,852, filed on Apr. 4, 1997, now abandoned.

(51) Int. Cl.[7] .............................. B28D 1/02; B28D 11/00
(52) U.S. Cl. ........................ 125/12; 51/297; 451/527; 451/529; 451/533; 451/544
(58) Field of Search .................... 51/297; 125/16.02, 125/21.12, 22; 451/527, 529, 533, 544

(56) References Cited

U.S. PATENT DOCUMENTS

| 187,593 A | 2/1877 | Brown et al. |
| 1,988,065 A | 1/1935 | Wooddell |
| 2,078,354 A | 4/1937 | Webster |
| 2,268,663 A | 1/1942 | Kuzmick |
| 2,612,348 A | 9/1952 | Catallo |
| 2,811,960 A | 11/1957 | Fessel |
| 2,867,086 A | 1/1959 | Haley |
| 2,876,086 A | 3/1959 | Raymond |
| 2,952,951 A | 9/1960 | Simpson |
| 3,067,551 A | 12/1962 | Maginnis |
| 3,121,981 A | 2/1964 | Hurst |
| 3,127,715 A | 4/1964 | Christensen |
| 3,276,852 A | 10/1966 | Lemelson |
| 3,293,012 A | 12/1966 | Smiley |
| 3,630,699 A | 12/1971 | Caitlin |

(List continued on next page.)

FOREIGN PATENT DOCUMENTS

| EP | 0238434 | 3/1987 |
| EP | 0331344 | 2/1989 |
| EP | 0264674 | 9/1995 |
| JP | 10128654 A | 5/1998 |
| JP | 10180618 A | 7/1998 |
| JP | 11048122 A | 2/1999 |
| JP | 11077536 A | 3/1999 |
| WO | 98/10897 | 3/1998 |
| WO | 98/45091 | 3/1998 |
| WO | 98/45092 | 3/1998 |
| WO | 98/51448 | 3/1998 |

*Primary Examiner*—Timothy V. Eley
(74) *Attorney, Agent, or Firm*—Thorpe North & Western, LLP

(57) ABSTRACT

The present invention provides a superabrasive tools and methods for making the same. In one aspect, superabrasive particles are chemically bonded to a matrix support material according to a predetermined pattern by a braze alloy that contains Cr, Mn, Si, or Al or mixtures thereof.

45 Claims, 4 Drawing Sheets

U.S. PATENT DOCUMENTS

| | | |
|---|---|---|
| 3,802,130 A | 4/1974 | Lindenbeck |
| 3,894,673 A | 7/1975 | Lowder et al. |
| 3,982,358 A | 9/1976 | Fukuda |
| 4,018,576 A | 4/1977 | Lowder et al. |
| 4,211,294 A | 7/1980 | Multakh |
| 4,341,532 A | 7/1982 | Oide |
| 4,355,489 A | 10/1982 | Heyer et al. |
| 4,565,034 A | 1/1986 | Sekiya |
| 4,669,522 A | 6/1987 | Griffin |
| 4,680,199 A | 7/1987 | Vontell et al. |
| 4,780,274 A | 10/1988 | Barr |
| 4,883,500 A | 11/1989 | Deakins et al. |
| 4,908,046 A | 3/1990 | Wiand |
| 4,916,869 A | 4/1990 | Oliver |
| 4,925,457 A | 5/1990 | deKok et al. |
| 4,945,686 A | 8/1990 | Wiand |
| 4,949,511 A | 8/1990 | Endo et al. |
| 4,968,326 A | 11/1990 | Wiand |
| 5,000,273 A | 3/1991 | Horton et al. |
| 5,022,895 A | 6/1991 | Wiand |
| 5,030,276 A | 7/1991 | Sung et al. |
| 5,049,165 A | 9/1991 | Tselesin |
| 5,092,082 A | 3/1992 | Padberg et al. |
| 5,092,910 A | 3/1992 | deKok et al. |
| 5,131,924 A | 7/1992 | Wiand |
| 5,133,782 A | 7/1992 | Wiand |
| 5,164,247 A | 11/1992 | Solanki et al. |
| 5,190,568 A | 3/1993 | Tselesin |
| 5,197,249 A | 3/1993 | Wiand |
| 5,203,881 A | 4/1993 | Wiand |
| 5,246,884 A | 9/1993 | Jaso et al. |
| 5,264,011 A | 11/1993 | Brown et al. |
| 5,266,236 A | 11/1993 | Bovenkerk |
| 5,380,390 A | 1/1995 | Tselesin |
| 5,453,106 A | 9/1995 | Roberts |
| 5,518,443 A | 5/1996 | Fisher |
| 5,527,424 A | 6/1996 | Mullins |
| 5,620,489 A | 4/1997 | Tselesin |
| 5,746,931 A | 5/1998 | Graebner et al. |
| RE35,812 E | 6/1998 | Oliver |
| 5,816,891 A | 10/1998 | Woo |
| 5,820,450 A | 10/1998 | Calhoun |
| 5,833,519 A | 11/1998 | Moore |
| 5,902,173 A | 5/1999 | Tanaka |
| 5,916,011 A | 6/1999 | Kim et al. |
| 5,921,856 A | 7/1999 | Zimmer |
| 5,961,373 A | 10/1999 | Lai et al. |
| 6,106,382 A | 8/2000 | Sakaguchi |
| 6,123,612 A | 9/2000 | Goers |
| 6,190,240 B1 | 2/2001 | Kinoshita et al. |
| 6,213,856 B1 | 4/2001 | Cho et al. |
| 6,286,498 B1 | 9/2001 | Sung |
| 6,368,198 B1 | 4/2002 | Sung et al. |

BRAZED DIAMOND TOOLS AND METHODS FOR MAKING

PRIORITY INFORMATION

This application is a continuation-in-part of U.S. patent application Ser. No. 09/399,573, filed Sep. 20, 1999, now issued as U.S. Pat. No. 6,286,498 which is a continuation-in-part application of U.S. patent application Ser. No. 08/835,117, filed Apr. 4, 1997, now issued as U.S. Pat. No. 6,039,641, and of U.S. patent application Ser. No. 08/832,852, filed Apr. 4, 1997, now abandoned all of which are incorporated herein by reference in their entirety.

FIELD OF THE INVENTION

The present invention relates to tools having diamond particles chemically bonded to a matrix support material, and arranged in a predetermined pattern. More particularly, the diamond particles are chemically bonded to the matrix material by a braze compound that wets diamond.

BACKGROUND OF THE INVENTION

Abrasive tools have long been used in numerous applications, including cutting, drilling, sawing, grinding, lapping and polishing materials. Because diamond is the hardest abrasive material currently known, it is widely used as a super-abrasive on saws, drills, and other devices, which utilize the abrasive to cut, form, or polish other hard materials.

Diamond tools are particularly indispensable for applications where other tools lack the hardness and durability to be commercially practical. For example, in the stone industry, where rocks are cut, drilled, and sawed, diamond tools are about the only tools that are sufficiently hard and durable to make the cutting, etc., economical. If diamond tools were not used, many such industries would be economically infeasible. Likewise, in the precision grinding industry, diamond tools, due to their superior wear resistance, are uniquely capable of developing the tight tolerances required, while simultaneously withstanding wear sufficiently to be practical.

Despite their prevailing use, diamond tools generally suffer from several significant limitations, which place unnecessary limits on their useful life. For example, the abrasive diamond or cubic boron nitride particles are not distributed uniformly in the matrix that holds them in place. As a result, the abrasive particles are not positioned to maximize efficiency for cutting, drilling, etc.

The distance between diamond or CBN abrasive particles determines the work load each particle will perform. Improper spacing of the diamond or CBN abrasive particles typically leads to premature failure of the abrasive surface or structure. Thus, if the diamond/CBN abrasive particles are too close to one another, some of the particles are redundant and provide little or no assistance in cutting or grinding. In addition, excess particles add to the expense of production due the high cost of diamond and cubic boron nitride. Moreover, these non-performing diamond or CBN particles can block the passage of debris, thereby reducing the cutting efficiency. Thus, having abrasive particles disposed too close to one another adds to the cost, while decreasing the useful life of the tool.

On the other hand, if abrasive particles are spaced too far apart, the workload (e.g., the impact force exerted by the work piece) for each particle becomes excessive. The sparsely distributed diamond or CBN abrasive particles may be crushed, or even dislodged from the matrix into which they are disposed. The damaged or missing abrasive particles are unable to fully assist in the workload. Thus, the workload is transferred to the surviving abrasive particles. The failure of each abrasive particle causes a chain reaction which soon renders the tool ineffective to cut, drill, grind, etc.

A typical superabrasive tool, such as a diamond saw blade, is manufactured by mixing diamond particles (e.g., 40/50 U.S. mesh saw grit) with a suitable metal support matrix (bond) powder (e.g., cobalt powder of 1.5 micrometer in size). The mixture is then compressed in a mold to form the right shape (e.g., a saw segment). This "green" form of the tool is then consolidated by sintering at a temperature between 700–1200 □C. to form a single body with a plurality of abrasive particles disposed therein. Finally, the consolidated body is attached (e.g., by brazing) to a tool body; such as the round blade of a saw, to form the final product.

Different applications, however, require different combinations of diamond (or cubic boron nitride) and support matrix powder. For example, drilling and sawing applications may require a large sized (20 to 60 U.S. mesh) diamond grit to be mixed with a metal powder. The metal powder is typically selected from cobalt, nickel, iron, copper, bronze, alloys thereof, and /or mixtures thereof. For grinding applications, a small sized (60/400 U.S. mesh) diamond grit (or cubic boron nitride) is mixed with either metal (typically bronze), ceramic/glass (typically a mixture of oxides of sodium, potassium, silicon, and aluminum) or resin (typically phenolic).

Because diamond or cubic boron nitride is much larger than the matrix powder (300 times in the above example for making saw segments), and it is much lighter than the latter (about ⅓ in density for making saw segments), it is very difficult to mix the two to achieve uniformity. Moreover, even when the mixing is thorough, diamond particles can still segregate from metal powder in the subsequent treatments such as pouring the mixture into a mold, or when the mixture is subjected to vibration.

The distribution problem is particularly troublesome for making diamond tools when diamond is mixed in the metal support matrix. In one aspect, the present invention may be particularly effective and useful for diamond saws that employ a metal matrix. For example, such saws are not limited to but may include circular saws, straight blades, gang saws, frame saws, wire saws, thin-walled cutoff saws, dicing wheels, and chain saws. In another aspect, the diamond tool may be a pad conditioner.

Over the decades, there have been numerous attempts to solve the diamond distribution problem. Unfortunately, none of the attempted methods have proven effective and, as of today, the distribution of diamond particles in diamond tools is still mostly random and irregular, except for some special cases such as for drillers or dressers, where large diamond particles are individually set in the surface to provide a single layer.

One method used in an attempt to make the diamond distribution uniform is to wrap diamond particles with a thick coating of matrix powder. The concentration of diamond particles in each diamond tool is tailored for a particular application. The concentration determines the average distance between diamond particles. For example, the concentration of a typical saw segment is 25 (100 means 25% by volume) or 6.25% by volume. Such a concentration makes the average diamond to diamond distance 2.5 times the particle size. Thus, if one coats the diamond to 0.75 times of its diameter and mixes the coated particles together, the distribution of diamond would be controlled by the thickness of coating and may become uniform. Additional metal powder may be added as an interstitial filler between these coated particles to increase the packing efficiency so the consolidation of the matrix powder in subsequent sintering would be easier.

Although the above-described coating metal has certain merit, in practice, uniformity of coating is very difficult to achieve. There are many chemical methods used to coat diamond grit and its aggregates (polycrystalline diamond). For example, Chen and Sung (U.S. Pat. Nos. 5,024,680 or 5,062,865 which are incorporated herein by reference) describe a CVD method for coating diamond grit using a fluidized bed. Sung et al. (U.S. Pat. Nos. 4,943,488 or 5,116,568, which are incorporated herein by reference) describe another CVD method for coating polycrystalline diamond by a fluidized bed process known to one skilled in the art. However, most of these methods can only produce thin coatings (e.g. a few micrometers) that do not affect the diamond distribution.

Moreover, chemical coating methods typically require treatment at high temperatures (e.g. greater than 900 □C.) that may cause damage to diamond. It is well known that synthetic diamond grit tends to form microcracks above this temperature. These micro-cracks are formed by the back-conversion of diamond to graphite at high temperature. The back-conversion is induced by the catalytic action of metal inclusions that diamond incorporates during its synthesis. CVD treatments cannot readily make thick coatings, and those which are formulated are often cost prohibitive. Thus, CVD treatments are not practical methods to make the diamond distribution uniform in the tool.

There are, however, less expensive mechanical methods (e.g., by tumbling diamond particles with metal powder) that can build up a thick coating on the diamond grit, typically at a low temperature that would not cause the degradation of diamond. However, it is very difficult to achieve a thick coating with uniform thickness using such methods.

For example, in attempts to practice the invention described in U.S. Pat. No. 4,770,907, which is incorporated by reference, and performing "Metal Coating of Saw Diamond Grit by Fluidized Bed" (see p 267–273 of Fabrication and Characterization of Advanced Materials, edited by S. W. Kim and S. J. Park of the Materials Research Society of Korea 1995), the thickness of coated diamond particles varied considerably. Moreover, only extremely fine (i.e. less than 5 micrometers) metal powders can be coated on diamond effectively. Furthermore, the reproducibility of this method is poor. Hence, although such coating may improve the diamond distribution in the tool, its effect is limited.

Furthermore, in mechanical coating, metal powder is held loosely by an organic binder (e.g., PVA, PEG). The coating may be easily rubbed off during the subsequent mixing process, thereby losing its intended benefit. Although heat treatment may increase the mechanical strength of the coating, nonetheless, it is an additional step with increased cost.

There is yet another limitation associated with the current methods of coating a tool with diamond grits. Many times a metal bond diamond tool requires different sizes of diamond grits and/or different diamond concentrations to be disposed at different parts of the same diamond tool. For example, saw segments tend to wear faster on the edge or front than the middle. Therefore, higher concentrations and smaller diamond grit are preferred in these locations to prevent uneven wear and thus premature failure of the saw segment. These higher concentration/smaller size segments (known as "sandwich" segments) are difficult to fabricate by mixing coated diamond with metal powder to achieve a controlled distribution of the abrasive particles in the segment. Thus, despite the known advantages of having varied diamond grit sizes and concentration levels, such configurations are seldom used because of the lack of a practical method of making thereof. In summary, current arts are incapable of efficiently controlling the uniformity of diamond distribution in cutting tools. Likewise, the current methods are inadequate to provide effective control of size variations and/or concentration variations on different parts of the same tool. Moreover, even when the distribution is made relatively uniform, current arts cannot tailor the pattern of the distribution to overcome or compensate for typical wear patterns for the abrasive material, when used for a particular purpose. By resolving these problems, the performance of a diamond and other superabrasive tools can be effectively optimized.

Another drawback of current arts is that the diamond particles, or "grits" are insufficiently attached to the tool substrate, or matrix support material, to maximize useful life of the cutting, drilling, polishing, etc., body. In fact, in most cases, diamond grit is merely mechanically embedded in the matrix support material of the tool substrate. As a result, diamond grit is often knocked off or pulled out prematurely during use. Moreover, the grit may receive inadequate mechanical support from the loosely bonded matrix under work conditions. Hence, the diamond particles may be shattered by the impact of the tool against the piece to which the abrasive, etc., is applied.

It has been estimated that, in a typical diamond tool, less than about one tenth of the grit is actually consumed in the intended application (i.e. during actual cutting, drilling, polishing, etc). The remainder is wasted by either being leftover when the tool's useful life has expired, or by being pulled-out or broken during use due to poor attachment and inadequate support. Most of these diamond losses could be avoided if the diamond particles can be properly positioned in and firmly attached to the surrounding matrix.

In order to maximize the mechanical hold on the diamond grits, they are generally buried deep in the substrate matrix. As a result, the protrusion of the diamond particles above the tool surface is generally less than desirable. Low grit protrusion limits the cutting height for breaking the material to be cut. As a result, friction increases and limits the cutting speed and life of the cutting tool.

In order to anchor diamond grit firmly in the support matrix, it is highly desirable for the matrix to form carbide around the surface of the diamond. The chemical bond so formed is much stronger than the traditional mechanical attachment. The carbide may be formed by reacting diamond with suitable carbide formers such as a transition metal. Typical carbide forming transition metals are: titanium (Ti), vanadium (V), chromium (Cr), zirconium (Zr), molybdenum (Mo), and tungsten (W).

The formation of carbide requires that the carbide former be deposited around the diamond and that the two subsequently be caused to react to form carbide. Moreover, the non-reacted carbide former must also be consolidated by sintering or other means. All these steps require treatment at high temperatures. However, diamond may be degraded when exposed to a temperature above 1,000° C. The degradation is due to either the reaction with the matrix material or the development of micro-cracks around metal inclusions inside the crystal. These inclusions are often trapped catalysts used in the formation of synthetic diamond.

Most carbide formers are refractory metals so they may not be consolidated below a temperature of about 1,200° C. Hence, refractory carbide formers are not suitable as the main constituent of the matrix support material.

There are, however, some carbide formers that may have a lower sintering temperature, such as manganese (Mn), iron (Fe), silicon (Si), and aluminum (Al). However, these carbide formers may have other undesirable properties that prohibit them from being used as the primary constituent of the matrix support material. For example, both manganese and iron are used as catalysts for synthesizing diamond at high pressure (above 50 Kb). Hence, they can catalyze diamond back to graphite during the sintering of the matrix powder at a lower pressure. The back conversion is the main cause of diamond degradation at high temperature.

Aluminum, on the other hand, has a low melting point (660° C.), thus, making it easy to work with for securing the diamond particles. However, the melting point of aluminum can be approached when diamond grit is cutting aggressively. Hence, aluminum may become too soft to support the diamond grit during the cutting operation. Moreover, aluminum tends to form the carbide $Al_4C_3$ at the interface with diamond. This carbide is easily hydrolyzed so it may be disintegrated when exposed to coolant. Hence, aluminum typically is not a suitable carbide former to bond diamond in a matrix.

To avoid the high temperature of sintering, carbide formers, such as tungsten, are often diluted as minor constituents in the matrix that is made primarily either Co or bronze. During the sintering process, there is a minimal amount, if any, of liquid phase formed. The diffusion of carbide former through a solid medium toward diamond is very slow. As a result, the formation of carbide on the surface of diamond is negligible. Therefore, by adding a carbide former as a minor matrix constituent, the improvement of diamond attachment is marginal at the best.

In order to ensure the formation of carbide on the surface of diamond, the carbide former may be coated onto the diamond before mixing with the matrix powder. In this way, the carbide former, although it may be a minor ingredient in the matrix, can be concentrated around diamond to form the desired bonding.

The coating of diamond may be applied chemically or physically. In the former case, the coated metal is formed by a chemical reaction, generally at a relatively high temperature. For example, by mixing diamond with carbide formers such as titanium or chromium, and heated the mixture under a vacuum or in a protective atmosphere, a thin layer of the carbide former may be deposited onto the diamond. Increasing temperature may increase the thickness of the coating. The addition of a suitable gas (e.g. HCl vapor) that assists the transport of the metal may also accelerate the deposition rate. Alternatively, the coating may be performed in a molten salt.

A commonly used chemical method for coating diamond is chemical vapor deposition (CVD). In this case, the deposited metal is produced by the reaction of gases at a high temperature. This technique may be used to deposit a thin layer of silicon (Si) onto the surface of diamond. The temperature of this deposition is high enough so silicon carbide is formed instantaneously at the interface.

In order to prevent diamond from possible degradation by exposure to high temperatures, a coating is produced at the lowest temperature possible. However, the coating often becomes too thin when deposited at a low temperature. For example, the coating produced by a typical chemical method is about one micrometer thick. There are some commercial diamond grits that contain such thin coatings. For example, General Electric Company offers saw grit that may be coated with a thin coating which includes either titanium or chromium.

However, when the thin coating is exposed to a high temperature, such as that which may be encountered during the sintering process, it can be easily oxidized in the atmosphere, or dissolved into the matrix metal. Thus, although a significant benefit is claimed for such commercially coated products, typically a ⅓ improvement in tool life, the ability for the thin coating to survive the manufacturing process is debatable.

In order to protect the thin metal coating, multiple layers of coating may be applied. An electroless process that is performed at a lower temperature may be used to deposit the second layer when using certain materials. Alternatively, a chemical coating may be deposited relatively thick by a CVD method. But again, such a coating is expensive, and its application has not been widely used.

In contrast to chemical methods, a physical method may be inexpensive. Moreover, it may deposit a thick metal coating onto diamond at a very low temperature. However, such a method, like many other similar processes, often produces coatings with different thickness. Moreover, only very fine (<5 micrometers) metal powders can be coated effectively onto the surface of diamond. Hence, although physical methods may be used to coat diamond grit with an alloy that contains a carbide former, their benefits are limited.

When diamond is coated mechanically by a metal powder, the powder is held loosely by an organic binder, e.g., polyvinyl alcohol (PVA), polyvinyl butyral (PVB), or polyethylene glycol (PEG). Such a coating may be easily rubbed off during the subsequent treatments, e.g., mixing or pressing. Although heat treatment may increase the mechanical strength of the coating, it may not consolidate the coating to the full density. A porous coating lacks the mechanical strength necessary to support diamond grit that is impacted repeatedly during the cutting operation.

Carbide formers may also be diluted in an alloy. If the alloy can melt below 1100° C., it may be used to braze the diamond without causing much degradation of the latter. Many diamond brazes are known in the art. Most are based on Group Ib solvents (copper, silver, and gold) that contain one or more carbide formers, e.g., gold-tantalum (Au—Ta), or silver-copper-titanium (Ag—Cu—Ti). These precious metal containing brazes, however, are typically too expensive for commercial use. Moreover, they are soft and unsuitable as ingredients for the matrix support material of diamond tools.

There are some high temperature filler metals that may be used to braze diamond. Such brazes may be hard enough to hold a diamond grit in place during cutting. However, these brazed diamond tools, although useful, are generally limited as surface set tools that contain only one layer of diamond. Such tools may not last when they are used to cut highly abrasive materials, e.g., granite. Moreover, in addition to holding the diamond, the brazing material in these tools, must also serve as the hard facing. The compromise of these dual-functions may not always be possible, as the optimal wear resistance of the tool surface may need to be adjusted for specific applications.

Alternatively, a diamond-bonding alloy may be used to infiltrate a high concentration (i.e. greater than 40% by volume) of diamond particles. However, the infiltration is very difficult due to the high concentration of diamond. Moreover, such products have limited applications, such as a drill bit. They are not applicable for most applications that require a lower concentration (i.e., less than 40% by volume) of diamond, such as saw blades and grinding wheels.

The hard facing alloys may also be used as the matrix support material. In one case, diamond is coated with a very thin layer of chromium, and subsequently palletizing the coated grit with a nickel-chromium alloy. Sintering the alloy then consolidates the palletized particles. However, as the consolidation process is taking place primarily in a solid phase, the bonding of matrix and diamond may be incomplete, or insufficient.

In addition to sintering, infiltration is also a common technique for making diamond tools; in particular for drill bits and other specialty diamond tools that contain large (i.e. greater than U.S. mesh 30/40) diamond grit. Most commonly used infiltrants for these tools are copper based alloys. These infiltrants must flow and penetrate the small pores in the matrix powder. In order to avoid the diamond degradation at high temperature, the melting point of the infiltrant must be low. Hence, the infiltrant often contains a low melting point constituent, such as zinc (Zn). In addition to lowering the melting point of the infiltrant, the low melting point constituent also reduces the viscosity so the infiltrant can flow with ease. However, as most carbide formers tend to increase the melting point of the infiltrant, they are excluded from most infiltrants. As a result, these infiltrants cannot improve the bonding of diamond. Thus, suitable methods of maximizing the efficiency, useful life, and other performance characteristics of diamond tools are continually being sought.

SUMMARY OF THE INVENTION

In one aspect, the present invention resolves the problems set forth above by providing a method for forming metal bond diamond or other super abrasive tools having a customized pattern of individual grit placement. Because the distribution of the diamond grits is controlled, the diamond grits can be disposed in detailed patterns which cause a specific pattern of tool wear, including uniform wear. Further, each superabrasive grit is more fully utilized, and there is no need for redundant superabrasive grits as a back up. Therefore, the cost of making the metal bond diamond or other superabrasive tools can be minimized by reducing the overall amount of superabrasive particles needed.

While the process of distributing diamond or cubic boron nitride grits in a metal matrix has always been viewed as a complex one and needs to be improved, the present invention provides, in one aspect, an improved process that is easy to manipulate and control, and which can be repeated with a high degree of accuracy. In some aspects, the desired distribution of abrasive particles in a metal matrix body may be achieved by assembling layers of metal matrix material that contain a controlled, predetermined pattern of abrasive particles. Each layer may be formed by distributing the superabrasive grits into a layer of bonding metal matrix in a predetermined pattern. The layers, may then be assembled to form a superabrasive impregnated tool segment, and can be of the same distribution pattern and concentration, or of differing distribution patterns and concentrations.

In accordance with one aspect of the present invention, each layer is assembled by providing a layer of metal support matrix and disposing, or planting, superabrasive grits in the metal support matrix layer in a desired pattern. After the diamond particles are planted into the metal matrix layer according to a predetermined pattern, the process may be repeated until a desired number of layers have been formed. These layers are then assembled to form the desired three-dimensional body. Subsequently the diamond tool is consolidated (e.g., by sintering or infiltration as described above) to form the final product.

By assembling layers of metal matrix impregnated with superabrasives in a predetermined pattern and concentration into a three dimensional body, the present invention not only provides the desirable diamond distribution pattern in the tool body, but also provides the flexibility for possible manipulation of diamond concentration at different parts of the same tool body. Thus, for example, diamond particles can be disposed in denser concentrations in some layers than others, and the layers with the greater diamond concentrations can be disposed within the three-dimensional structure created in such a manner as to prevent the uneven wear patterns that are typical in many prior art abrasive tools.

In accordance with another aspect of the present invention the process involves the method of providing a matrix support material, and then distributing a plurality of diamond particles on a top surface of the matrix support material, or planting them therein, according to a predetermined pattern. The diamond particles are then bonded to the matrix support material with a brazing alloy. In one aspect, the amount of diamond particles may be less than 50 percent of the total combination of diamond particles and matrix support material. In another aspect, the amount of diamond particles may be may be less than 40 percent of the total combination of diamond particles and matrix support material.

The matrix support material may be a variety of materials, including various metals, and may be in a powdered or particulate form. When a powdered matrix support material is used, an organic binder may be added in order to provide a desired degree of adhesion between the particles and allow the matrix to be manipulated as a coherent mass. In one aspect, the brazing alloy may be used as the matrix support material. In another aspect, the metallic powder may have an average particle size of greater than about 400 mesh. In yet another aspect, the particles may be irregularly shaped. While conventional methods require the density of the green body be as high as possible so subsequent sintering can proceed rapidly, it has been found in accordance with the present invention, that excellent bonding results may be achieved by using a matrix with a lower packing density to allow the easy flow of the diamond braze. The irregularly shaped particles further increase the porosity of the matrix material. This technique is again contrary to the conventional wisdom that requires the particles be as spherical as possible so the packing density can be increased.

The arrangement of the diamond particles in a predetermined pattern in the matrix support material may be accomplished by placing a template having a plurality of apertures in a pattern upon a top surface of the matrix support material, filling the apertures with diamond particles. As the particles fill the apertures, they may be subjected to pressure or otherwise moved into the metal bonding matrix such that the diamond particles remain embedded in the matrix support material. Next, the template is removed, and depending on the requirements of the tool being formed, the diamond particles may be pressed further into the matrix support material Because of the template, the particles which enter the metal bonding matrix are each positively planted at specific locations and held in the metal matrix according to a predetermined pattern. In one aspect, a plurality of such metal matrix layers impregnated with diamond particles may then be bonded together to form a tool as recited above.

The superabrasive particles may also be affixed to a transfer plate and then transferred to the matrix support layer. In one aspect of this embodiment, the transfer plate can be made of metal or plastic. Preferably, the transfer plate is made of transparent plastic such that the transfer of superabrasive particles can be easily monitored. The affixing of superabrasive particles to the transfer plate can be facilitated by coating the transfer plate with a thin layer of adhesive. The template is then used to distribute the superabrasive particles onto the transfer plate in the desired predetermined pattern. The transfer plate having superabrasive particles adhered thereto on one side is pressed against the matrix support layer. The superabrasive particles are transferred to the matrix support layer by either embedding in the matrix support layer or adhering to an adhesive coated on the surface of the matrix support material. The adhesive coated on the matrix support material preferably adheres the superabrasive particles more strongly than the adhesive coated on the transfer plate.

The arrangement of apertures used in the template may be in a wide variety of patterns, including those determined to maximize tool performance during specific applications. In one aspect, the pattern of apertures, and thus the resulting predetermined pattern of diamond particles, may be a uniform grid. In another aspect the superabrasive particles may be disposed in varied concentration patterns to compensate for uneven wear. Thus, the diamond distribution for the cutting edge of a saw may have a greater distribution of diamond particles on the lead edge and sides than on the middle portion which is generally subjected to less wear. Likewise, the sizes of the superabrasive particles can be controlled to provide a cutting, grinding, etc., surface which is tailored to the particular uses and wear patterns for the tool.

As recited above, in one aspect of the present invention, the matrix support material may be made of metal, and may further be in a powder or particulate form. Examples of such metals include without limitation, cobalt, nickel, iron, bronze or their alloys or mixtures (e.g. tungsten or its carbide).

In another aspect of the present invention the matrix support material may consist solely, or essentially, of a metal braze material. As such, the superabrasive particles can be distributed or planted in the metal braze material when it is presented in a powdered or particulate form. The superabrasive embedded braze material can then be bonded to a tool substrate. Alternatively, the superabrasive particles may be glued directly to a tool substrate using a suitable binder. Then the braze material may then be applied to the surface, for example by sprinkling the braze powder onto the tool substrate, and heated above its melting point. Thus the molten braze can chemically bond the superabrasive particles to the substrate.

In accordance with still yet another aspect of the present invention, the matrix support material may contain ingredients designed to enhance certain properties. For example, hard materials such as tungsten, tungsten carbide and silicon carbide may be added to increase wear resistance. Soft materials, such as molybdenum sulfide, copper, and silver, may also be added as solid lubricants.

Yet another aspect of the present invention is to mix diamond grits with a powdered form of matrix support material and a binder material, such as an organic binder, and rolled to form a sheet or layer. In this case, although diamond grits distribution does not form a predetermined pattern, it is much more uniform than mixing metal powder with diamond grits to form thick body by a simple mixing process. Later, the layers can be stacked up to form the final body.

The matrix support material may be prepared by any conventional method. An organic binder (e.g., PVA or PVB) may be added to hold the mixture. In one aspect, a powdered form of brazing material may be mixed with the powdered form of the matrix support material prior to the addition of the organic binder. The mixture is then cold pressed to form the desirable shape (e.g., a saw blade). Superabrasive particles may then be implanted into the matrix support material using the above-recited procedures. The precursor (i.e. combination of matrix support material and superabrasive particles) is then ready to be processed using various heat and pressure conditions to have the diamond particles bonded to the matrix support material.

A wide variety of brazing alloys may be used in connection with the present invention to bond the diamond particles to the matrix support material. In one aspect, the brazing alloy may be substantially free of zinc, lead, and tin. One commercially available alloy, which is suitable for use with the present invention, is known by the trade name NICROBRAZ LM (7 wt % chromium, 3.1 wt % boron, 4.5 wt % silicon, 3.0 wt % iron, a maximum of 0.06 wt % carbon, and balance nickel), made by Wall Colmonoy Company, Madison Heights, Mich. Other suitable alloys included copper, aluminum, and nickel alloys containing chromium, manganese, titanium, and silicon. In one aspect, the brazing alloy may include a mixture of copper and manganese. In an additional aspect, the amount of chromium, manganese, and silicon may be at least about 5 percent by weight. In another aspect, the alloy may include a mixture of copper and silicon. In yet another aspect, the alloy may include a mixture of aluminum and silicon. In a further aspect, the alloy may include a mixture of nickel and silicon. In another aspect, the alloy may include a mixture of copper and titanium.

The process of bonding the diamond particles to the matrix support material using the brazing alloy may be accomplished by a variety of methods. In one aspect, the brazing alloy may be disposed on the top surface of the matrix support material, after the diamond particles have been distributed therein. The brazing alloy and matrix support material are then heated to a temperature sufficient to allow the brazing alloy to infiltrate into the matrix support material, and bond the diamond particles thereto. In one aspect, the infiltration process may be carried out in a controlled atmosphere, such as under a vacuum, typically about $10^{-5}$ torr, an inert atmosphere (e.g., argon (Ar) or nitrogen ($N_2$)), or a reducing atmosphere (e.g., hydrogen ($H_2$)). Such atmospheres may increase the infiltration of the brazing alloy into the matrix support material, and therefore, enhance the diamond-matrix bonding.

Alternatively, a powdered form of brazing alloy may be mixed with a powdered form of matrix support material, and the organic binder. The mixture may then be formed into a desired shape, such as a sheet, and the diamond particles distributed or planted therein according to a predetermined pattern. The mixture of matrix support material and brazing alloy may then be heated to a temperature sufficient to bond the diamond particles to the matrix support material.

Additionally, as described above, the powder blend of the supportive material may formed into a sheet. The sheet can then be formed into desired shape (e.g., a saw segment) (See FIG. 1), and several sheet segments may be assembled to form a tool precursor (see FIGS. 2, 3, 4) for heat and pressure processing. By assembling substantially two-dimensional segments to form a three-dimensional body, the distribution of diamond grit in a tool can be positively controlled. Thus, diamond concentration in different parts of the same tool may be adjusted (see FIGS. 1A through 4). Such a control of diamond distribution is highly desirable to improve the wear characteristics of the tool. For example, the sides of a diamond saw blade are often worn faster then the center, so it is advantageous to add more diamond grit on the sides (see FIG. 1B).

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Figure 1A:
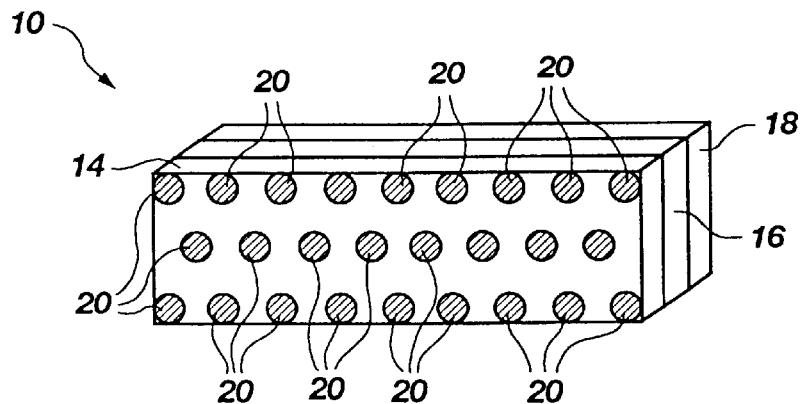
FIG. 1A shows a segment from a super abrasive tool formed by a plurality of linear, longitudinal layers disposed adjacent one another to form a three-dimensional super abrasive member.

Before the compositions and methods of the present invention are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus, for example, reference to "a matrix material" includes reference to one or more of such materials, and reference to "an alloy" includes reference to one or more of such alloys.

As used herein, "substantially free of" refers to the lack of an identified element or agent in a composition. Particularly, elements that are identified as being "substantially free of" are either completely absent from the composition, or are included only in amounts which are small enough so as to have no measurable effect on the composition.

As used herein, "predetermined pattern" refers to a non-random pattern that is identified prior to construction of a tool, and which individually places or locates each superabrasive particle in a defined relationship with the other diamond particles, and with the configuration of the tool.

As used herein, "uniform grid pattern" refers to a pattern of diamond particles that are evenly spaced from one another in all directions.

As used herein, "irregularly shaped" refers to a shape that is not a standard geometric shape, e.g. shapes that are not round, oval, square, etc.

As used herein, "matrix," "matrix support material," "matrix support layer," and "matrix material," may be used interchangeably, and refer to a material to which superabrasive particles may be bonded. In one aspect, the superabrasive particles may be bonded or fixed to a surface of the matrix. In another aspect, the superabrasive particles may be fixed or planted into the matrix. In yet another aspect, the matrix material may take the shape of a tool body. In a further aspect, the matrix material may take the shape of a sheet having a specified thickness. In another aspect, the matrix material may be presented as a solid metal. In an additional aspect, the matrix material may be presented in a powdered or particulate form As used herein, "alloy" refers to a solid or liquid mixture of a metal with a second material, said second material may be a non-metal, such as carbon, a metal, or an alloy which enhances or improves the properties of the metal.

As used herein, "metal brazing alloy," "metal alloy," "brazing alloy," "braze alloy," "braze material," and "braze," may be used interchangeably, and refer to a metal alloy which is capable of chemically bonding to superabrasive particles, and to a matrix support material, so as to substantially bind the two together.

As used herein, "superabrasive particles" and "superabrasive grits" may be used interchangeably, and refer to particles of either natural or synthetic diamond, or of other super abrasive materials, which are suitable for working a workpiece such as stone, cement, or asphalt, for example, cubic boron nitride (CBN), or poly cubic boron nitride (PCBN).

As used herein, "aperture" refers to an opening through a template surface which has a predetermined size and shape depending on the intended application. For example, the aperture size may be designed to accommodate a plurality of superabrasive particles of a given mesh size. However, it is often desirable to design the apertures such that only one superabrasive particle is accommodated by each aperture.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a concentration range of about 1% w/w to about 4.5% w/w should be interpreted to include not only the explicitly recited concentration limits of 1% w/w to about 4.5% w/w, but also to include individual concentrations such as 2% w/w, 3% w/w, 4% w/w, and sub-ranges such as 1% w/w to 3% w/w, 2% w/w to 4% w/w, etc. The same principle applies to ranges reciting only one numerical value, such as "less than about 4.5% w/w," which should be interpreted to include all of the above-recited values and ranges. Further, such an interpretation should apply regardless of the breadth of the range or the characteristic being described.

B. The Invention

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. Referring to FIG. 1A, there is shown a perspective view of a segment, generally indicated at 10, formed by a plurality of layers, 14, 16 and 18. Each of the layers 14, 16 and 18 is formed by matrix support material 24 impregnated with diamond particles, indicated by the dark circles 20, and has been infiltrated with a braze 28 selected to bond to the diamond particles and the matrix support material. Preferably, the diamond particles 20 constitute less than 50 percent of the matrix support material—diamond mixture, and more preferably less than 40 percent. Keeping the amount of diamond particles to the minimum helps to minimize cost while optimizing the useful life of the product.

Preferably, the diamond braze contains at least 3% by weight of a member selected from the group consisting of chromium, manganese, silicon, titanium, and aluminum, and alloys and mixtures thereof. Additionally, the diamond braze should have a liquidus temperature of less than 1,100° C. to avoid damage to the diamond during the brazing process.

As discussed in U.S. Pat. No. 6,159,286, which is expressly incorporated herein, forming the segment 10 in a plurality of thin layers provides remarkably improved control over the distribution of the diamond particles 20. By controlling the distribution of the diamond particles 20 within each layer and then combining layers, a three-dimensional segment can be formed in which distribution of the diamond particles is controlled in each dimension. This, in turn, enables the formation of segments, which are particularly adapted to the likely use of the segment, be it for polishing, cutting, grinding, etc. By tailoring the distribution and concentration of the super abrasive particles within the segment 10, more precise control is given over performance of the tool under actual working conditions.

For example, when using a diamond saw blade to cut rocks (e.g., granite), the two sides of the diamond saw segments are cutting more materials than the center. As a result of uneven wear, the cross section of the saw segment becomes convex in shape with the center bulging above both sides. This configuration typically slows the cutting rate of the saw blade. Moreover, the protruding profile may also cause the saw blade to deflect sideways in the cut slot. In order to maintain a straight cutting path, it is sometimes desirable to make a "sandwich diamond segment" to reinforce both sides of the segment with layers impregnated with more diamond or superabrasive grits. Such a "sandwich segment" is difficult to manufacture by mixing diamond grit with metal powder by conventional means, but it can be easily accomplished by methods of the present invention: first planting diamond grits with desirable patterns and concentrations in a metal matrix layer and then assembling these metal matrix layers with diamond grits impregnated in the predetermined patterns and concentrations together to form a sandwiched segment.

The present invention further improves the above technique by infiltrating the matrix support material 24 with a braze 28 which is selected to chemically bond to the diamond particles and to the matrix support material. Thus, while the placement of the diamond particles shown in FIG. 1A is a marked improvement over the prior art, an additional increase in the useful life of segment 10 is obtained by utilizing a braze to form a chemical bond, rather than merely relying on mechanical retention of the diamond particles.

Figure 1B:
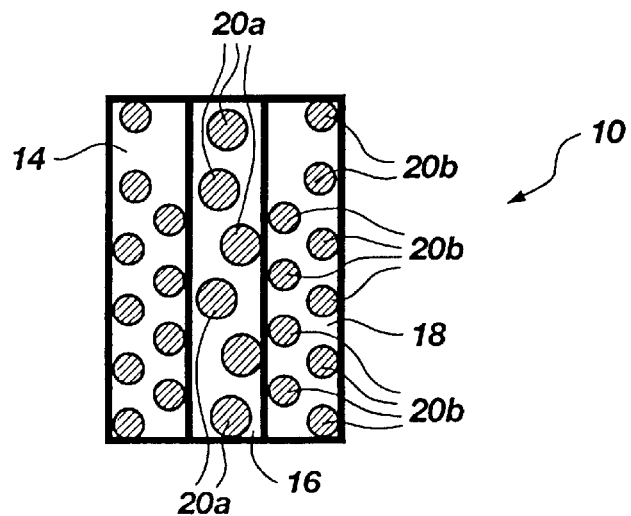
FIG. 1B shows a cross-sectional view of one typical configuration of the tool segment shown in FIG. 1A, wherein a layer formed by a matrix support material and a relatively large super abrasive is sandwiched between two layers of matrix support materials, which have smaller grit, and higher concentration of the abrasive.

Likewise, the selective placement of differing sizes of diamond particles can used to form a cutting segment formed to resist premature wear to the sides of the segment, thereby extending the cutting segment's useful life. Referring specifically to FIG. 1B, there is shown a cross-sectional view of the cutting segment 10 of FIG. 1A. Unlike the cutting segments of the prior art, the cutting segment 10 is formed of three layers, 14, 16 and 18 respectively. The middle layer 16 has a plurality of super abrasive particles 20a, which are of a first size (e.g. 40/50 mesh) and a first concentration. The outer layers 14 and 18, in contrast, have a plurality of super abrasive particles 20b, which are of a second size (e.g. 50/60 mesh) smaller than the first size, and in a second concentration greater than that present in the middle layer 16. The smaller, more densely distributed super abrasive particles 20b provide the outer layers 14 and 18 with a greater resistance to wear as they cut through concrete, rock, asphalt, etc. Because the outer layers 14 and 18 are more resistant to wear, the cutting segment 10 resists formation of a convex outer surface, as has traditionally occurred with cutting elements. By maintaining a more planar cutting surface, the cutting segment is able to maintain a straight cutting path so it can cut more efficiently with a longer useful life. Moreover, by using a smaller grit on the flank of the saw, the finish of the cut surface is smoother and chipping of the workpiece can be avoided.

Furthermore, an additional increase in useful life is obtained by infiltrating the matrix support material 24 with a braze 28 formed from chromium, manganese, silicon, titanium, and/or aluminum, or an alloy or mixture thereof. While a wide variety of quantities of these materials may be used, it has been found that it is preferable if the chromium, manganese, silicon, titanium, or aluminum or alloy or mixture in the diamond braze constitutes at least 3 percent of the braze by weight (and more preferably 5 percent). The braze 28 fills the pores in the matrix support material 24, which is typically powder selected from the group including iron, cobalt, nickel or alloys or mixtures thereof.

Figure 2A:
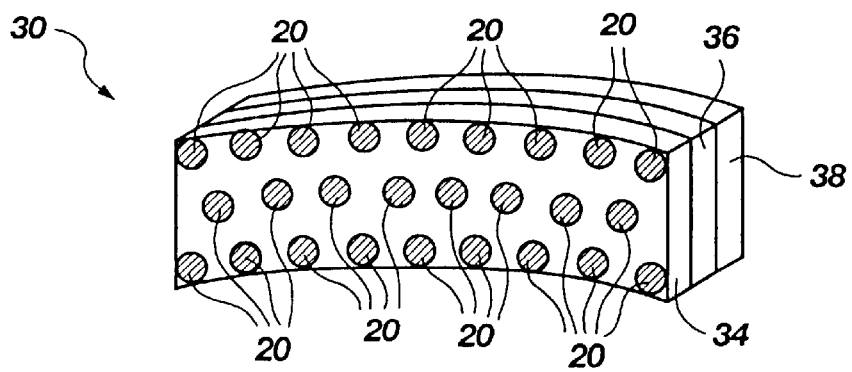
FIG. 2A shows a segment from a super abrasive tool formed by a plurality of arcuate, longitudinal layers, which are attached to one another to form a three-dimensional super abrasive member.

Another advantage to the use of multiple layers of matrix with diamond or some other super abrasive particle disposed therein is that the layers are easily formed into other desirable shapes for the cutting, drilling, grinding, etc., segment. For example, FIG. 2A shows a perspective view of a segment, generally indicate at 30, of a super abrasive tool formed by a plurality of arcuate, longitudinal layers which are attached to one another to form a three-dimensional super abrasive member which has been infiltrated with the braze 28 to thereby hold the diamond within the member. The segment 30 is formed from first, second and third layers, 34, 36 and 38, which are each arcuate. When the three are joined together, an arcuate segment 30 is created. Such a segment, of course, may be used on cutting tools, which are non linear, and on other types of tools for which a nonlinear super abrasive segment is desired. Because the layers 34, 36 and 38 are initially formed independent of one another, they are much easier to conform to a desired shape, and are able to do so while the brazed diamond particles 20 disposed therein are held in their predetermined positions.

Each of the layers is impregnated with a plurality of superabrasive particles 20, typically diamond or cubic boron nitride. Because each layer is a relatively thin layer of metal matrix, (i.e., the metal matrix will usually be no more than two times the thickness of the diameter of the particles), superior control over placement of the superabrasive particles in the metal matrix layer can be easily achieved. As discussed above, the random placement of superabrasives in abrasive tools in the current art often lead to ineffective use of superabrasive particles. By controlling distribution of superabrasives the present invention enables either even distribution which prevents under or over spacing, or controlled distribution so that different portions of the segment have different sizes and concentrations which are matched to prevent traditional wear patterns.

Figure 2B:
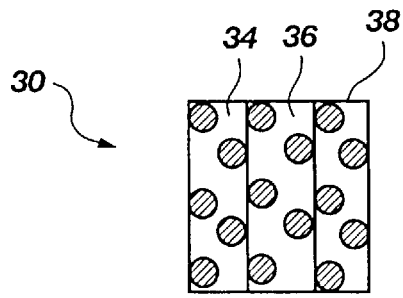
FIG. 2B shows a cross-sectional view of a plurality of layers matrix support material as may be used with the segment shown in FIG. 2A.

Referring now to FIG. 2B, there is shown a cross-sectional view of a plurality of the layers 34, 36 and 38 of the segment 30. Of course, the configuration of the diamond particles may be used with the segment shown in FIG. 1A or that shown in FIG. 2A. Unlike the embodiment of FIG. 1B, the layers are each provided with the same size and concentration of the diamond particles 20. However, because the spacing is substantially uniform, there is no under spacing or over spacing between the super abrasive particles, and the segment 30 wears more evenly than the segments of the prior art with randomly spaced particles. The more even wear prevents premature failure of the segment 30, and thus extends the life of the tool while keeping the amount of super abrasive used to a minimum. Furthermore, the braze 28 which bonds to the diamond particles and the matrix 24 further strengthens each layer and prevents loss of the diamond particles 20.

Figure 3:
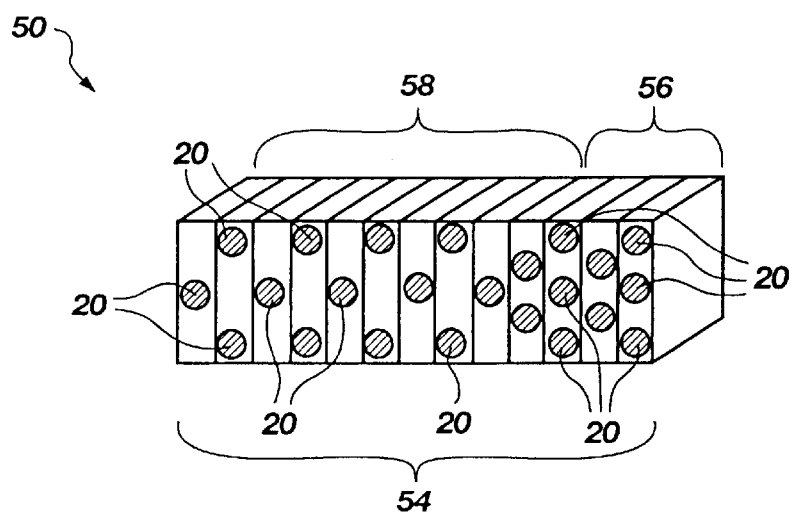
FIG. 3 shows another possible layout of a segment of a cutting tool with transverse layers configured with a denser concentration of abrasive material disposed at a forward, cutting end of the three-dimensional super abrasive member.

FIG. 3 shows another possible embodiment of a segment 50 made in accordance with the teachings of the present invention. The layered structure in a diamond segment may also be assembled transversely or horizontally, and the braze 28 may be applied to every layer, or to select layers as shown in FIG. 3. Thus, the segment 50 in FIG. 3 is formed from a plurality of transverse layers, generally indicated at 54. A first plurality of the layers (i.e. the first four layers), indicated at 56, are provided with a first concentration of diamond particles 20 which are brazed to bond to the matrix support material 24. A second plurality of layers (i.e. the remaining 9 layers), indicated at 58, are provided with a second concentration, less than the first concentration and are also brazed to bond to the matrix support material 24.

Many cutting tools are configured such that the cutting segment 50 is provided with a lead edge which performs a majority of the cutting and which receives most of the impact force when contacting the surface to be cut. For example, a circular saw blade will usually have a plurality of teeth or segments, each tooth having a leading edge, which takes the force of the cutting. Because the leading edge performs a significant portion of the cutting, it is much more susceptible to wear than are rotationally rearward portions of the tooth. When formed in accordance with the prior art, the teeth, however, often had relatively consistent abrasive disposed thereon. Over time the leading edge wears significantly, but the other portions coated with diamond particles are subjected to minimal wear. Eventually, the abrasive is worn off the leading edge, while significant amounts remain on the other portions of each tooth. Thus, a considerable amount of super abrasive is wasted when the blade is discarded. The embodiment of FIG. 3 is specifically configured to overcome such concerns. The layers 56 and 58 are configured to provide substantially even wear across the cutting segment 50 by placing a larger percentage of the diamond particles 20 near the leading edge 56, than on rotationally distal portions 58. Thus, by the time the leading edge has reached the end of its useful life, the remaining portions of the cutting segment 50 have also been worn out. Such controlled distribution of the superabrasive particles 20 decreases the use of the expensive material and lowers the cost for making the cutting segment 50 without hurting performance. Additionally, by providing more ever wear, the cutting segment 50 will often be able to maintain most of its cutting speed until shortly before the end of its useful life. Additionally, brazing the diamond particles 20 in layers 56 and 58 further extends tool life.

Figure 4:
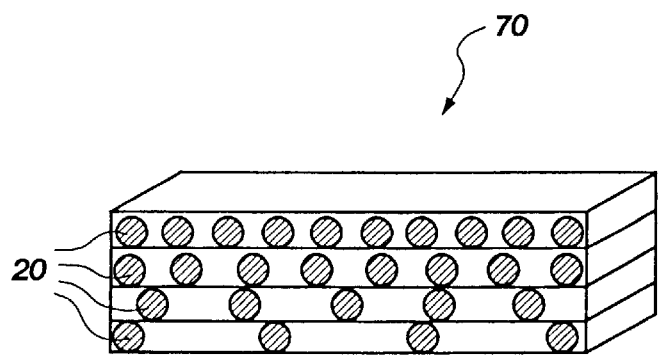
FIG. 4 shows yet another layout of a segment wherein a three-dimensional super abrasive member is formed with progressively denser abrasive distribution toward the upper surface of a tool with horizontal layers.

FIG. 4 shows yet another layout of a segment wherein a three-dimensional super abrasive member is formed with progressively denser abrasive distribution toward the upper surface of a tool with horizontal layers. As with the embodiment of FIG. 3, the controlled distribution of the diamond particles 20 forms an improved abrasive segment 70, while at the same time decreasing the cost of abrasive tools by decreasing the unnecessary consumption of diamond particles. Additionally, brazing may be used on some of the layers, while being omitted from other layers, to thereby customize the abrasive segment 70.

With routine experimentation and the teachings of the method of the present invention, those skilled in the art will be able to customize cutting, drilling, grinding, polishing and other types of abrasive segments which are specifically formed to maximize their abrasive ability (i.e. cutting, drilling, grinding, etc.) over an extended useful life, while simultaneously decreasing the amount of super abrasive which is used to form the tool.

Referring now to FIGS. 5A through 5D, there is shown one method for forming layers in accordance with the principles of the present invention. The first step of the method is to form a sheet 100 of matrix support material 104 which will be bonded to the super abrasive particles 20. The sheet 100 of matrix support material 104 can be formed from conventional powders such as cobalt, nickel, iron, copper, bronze, or any other suitable bonding agents. Additionally, for reasons, which are discussed in detail below, it is highly advantageous to use course powders, such as those above 34 microns (400 mesh) in diameter. While the use of coarse powders is inconsistent with the current teachings that it is desirable to use the finest powder available, considerable benefits may be achieved by combining course powder and braze to secure diamond particles in place.

There are many ways that a matrix powder can be made into the sheets 100. For example, the powder can first be mixed with a suitable binder (typically organic) and a solvent that can dissolve the binder. This mixture is then blended to form a slurry with a proper viscosity. In order to prevent the powder from agglomeration during the processing, a suitable wetting agent (e.g., menhaden oil, phosphate ester) may also be added. The slurry can then be poured onto a plastic tape and pulled underneath a blade or leveling device. By adjusting the gap between the blade and the tape, the slurry can be cast into a plate with the right thickness. The tape casting method is a well-known method for making thin sheets out of powdered materials and works well with the method of the present invention.

Alternatively, the powder can be mixed with a suitable binder and its solvent to form a deformable cake. The cake can then be extruded through a die with a slit opening. The gap in the opening determines the thickness of the extruded plate. Alternatively, the material can also be drawn between two rollers with adjustable gap to form sheets with the right thickness.

It is desirable to make the sheets pliable for subsequent treatments (e.g., bending over the tool substrate). Therefore, a suitable organic plasticizer can also be added to provide the desired characteristics.

The use of organic agents for powder (metal, plastics, or ceramics) processing is documented in many textbooks and it is well known by those skilled in the art. Typical binders include polyvinyl alcohol (PVA), polyvinyl butyral (PVB), polyethylene glycol (PEG), pariffin, phenolic resin, wax emulsions, and acrylic resins. Typical binder solvents include methanol, ethanol, acetone, trichlorethylene, toluene, etc. Typical plasticizers are polyethylene glycol, diethyl oxalate, triethylene glycol dihydroabietate, glycerin, octyl phthalate. The organic agents so introduced are to facilitate the fabrication of metal layers. They must be removed before the consolidation of metal powders. The binder removal process (e.g., by heating in a furnace with atmospheric control) is also well known to those skilled in the art.

Once the sheet 100 of matrix support material 104 is formed, a template 110 is laid on the top of the sheet. The template 110 contains apertures 114 that are larger than one abrasive particle 20, but smaller than two abrasive particles, thereby allowing a single particle of the abrasive to be disposed at each specific location.

The thickness of the template is preferably between 1/3 to 2/3 of the height of the average abrasive particle 20. However, other thicknesses may be used if appropriate accommodations are made for seating the abrasive particles in the desired locations.

After the template 110 is properly positioned, a layer of abrasive particles 20 is then spread over the template so that each aperture 114 receives an abrasive particle. Those particles not falling into the apertures 114 in the template 110 are removed by tilting the substrate, sweeping the template with a broom, or some other similar method.

Figure 5A:
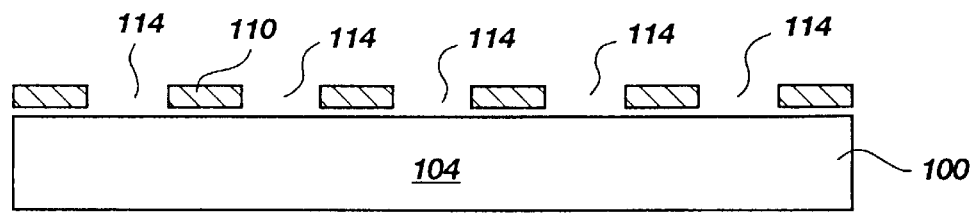
FIGS. 5A through 5D show one possible method for forming layers with controlled super abrasive distribution within the layer.
Figure 5B:
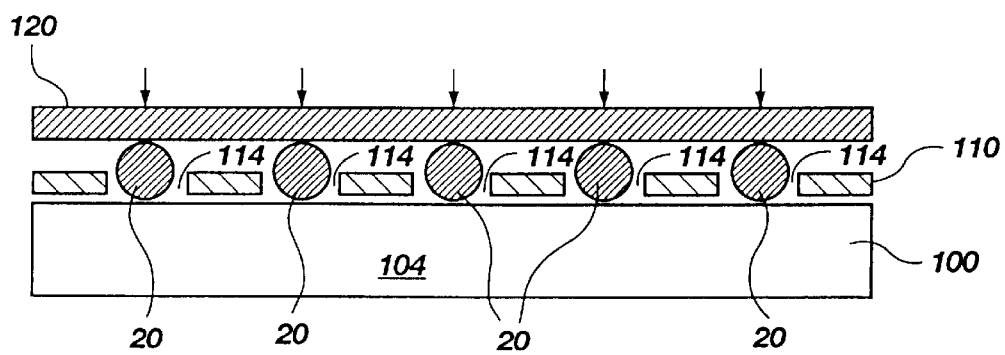

As shown in FIG. 5B, a generally flat surface 120, such as a steel plate, is then laid over the particles 20, which rest in the apertures 114 in the template 110. The flat surface 120 presses the abrasive particles 20 at least partially into the pliable sheet 100 of matrix support material 104 to seat the particles.

Figure 5C:
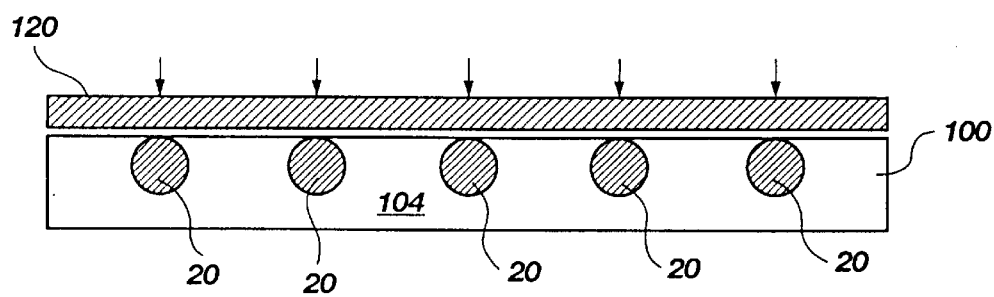

After removing the template 110, the flat surface 120 is used again to press the abrasive particles 120 firmly into the sheet 100 of matrix support material 104 as shown in FIG. 5C. While the flat surface 120 is preferable, those skilled in the art will appreciate that there may be occasions when it is desirable to have some of the abrasive particles 20 extend outwardly from the sheet 100 of matrix support material more that other abrasive particles. In such situations, a contoured or otherwise shaped surface could be used to seat some of the abrasive particles 20 deeper into the sheet 100 of matrix support material 104, than other particles.

Alternatively, the sheet 100 may be a transfer plate onto which the superabrasive particles 20 are affixed to one side. The same methods may be used as described above with regard to using a template 110 to achieve a particular pattern of superabrasive particles. The transfer plate having superabrasive particles 20 affixed thereon is then pressed against a matrix support material 104. The transfer plate may be made of metal or plastic, however it has been found that a transparent plastic transfer plate increases ease of use. Affixing of the particles to the transfer plate may be accomplished using any adhering means, such as an adhesive. In order to facilitate transfer of the superabrasive particles 20 to the matrix support material 104 an adhesive which adheres more strongly to the matrix support material 104 than to the transfer plate can be used. The transfer plate is then removed and treatment such as adding a braze, further pressing the particles into the matrix support, and/or heating to produce the final product may be performed.

Figure 5D:
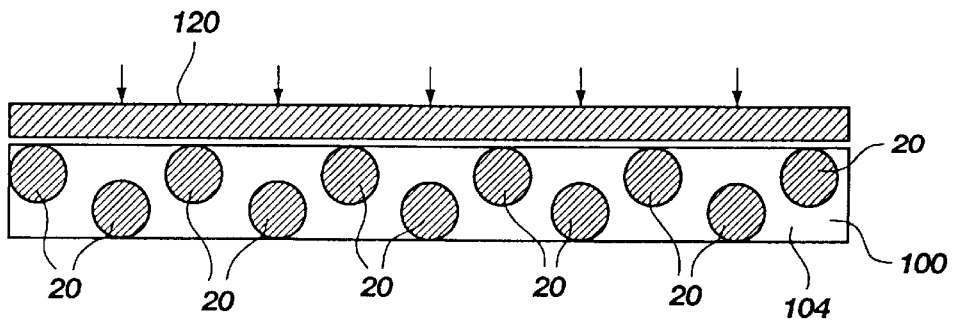

If desired, the process shown in FIGS. 5A through 5C can be repeated on the other side of the sheet 100 of matrix support material 104 (as shown in FIG. 5D), to form an impregnated layer having diamond particles 20 distributed throughout the layer in some predetermined, desired pattern. The process is typically repeated several times to obtain multiple thin layers or sheets 100, which are impregnated with the diamond particles 20. Of course, each sheet 100 need not have the same distribution pattern for the diamond particles 20, nor need the concentration of the abrasive particles be the same in each sheet.

The abrasive impregnated sheets 100 are then infiltrated with a braze which is formed with chromium, manganese, silicon or alloys or mixtures thereof. While prior art brazes typically include metals which were designed to facilitate flow of the braze material, such as zinc, lead and tin, it has been found in accordance with the present invention that such materials actually impair the brazing process. The materials are generally more volatile, and have a tendency to contaminate the vacuum or inert atmosphere used in infiltration. While very small amounts of the volatile metals will not significantly interfere with brazing, amounts over about 1 or 2 percent can inhibit proper infiltration. As used herein, substantially free of volatile metals, or substantially free of zinc, etc. is used to characterize such a situation in which the volatile metal is present in sufficiently small amounts as to not provide any meaningful impediment to infiltration.

It is important that the infiltration temperature be kept lower than the melting point of the matrix powder so the tool body can maintain the shape during the infiltration of the diamond braze. Moreover, the brazing temperature must also be low enough to not cause diamond to degrade. In addition to control the brazing temperature, the brazing time should also be kept short so the braze will not react excessively with diamond and the matrix powder. In the former case, diamond may also be degraded. In the later case, the alloying with the matrix powder may raise the melting point of the diamond braze. As a result, the diamond braze may solidify gradually and eventually stop to flow.

The environment for infiltration also may be controlled to provide superior performance. For example, if the braze material contains a strong getter of oxygen or nitrogen, such as titanium, a high degree of vacuum ($10^{-6}$ torr maximum) must be maintained during the infiltration of the braze. On the other hand, if the braze material contains a less sensitive getter, such as chromium and manganese, a lower degree of vacuum ($10^{-5}$ torr minimum) or a hydrogen atmosphere may be adequate for the infiltration.

After the infiltration, the produced part (e.g., a saw segment) may be trimmed (e.g., by grinding) to the finished dimension. It can then be mounted (e.g., by brazing) onto a tool body (e.g., a round steel blade) to make a finished product.

As discussed above, this invention uses a diamond braze as the infiltrant that penetrates the matrix powder of a diamond tool. Most diamond brazes can wet easily common matrix powders with major constituents of cobalt, nickel, iron, copper or bronze, so the infiltration may proceed smoothly.

In addition to infiltration using the methods described above, the bonding of the diamond particles to the matrix material using the brazing alloy may be accomplished by mixing a powdered form of brazing alloy with a powdered form of matrix material. The organic binder is then added, and the matrix support material and brazing alloy are formed into a sheet, or layer as described above. Diamond particles are then distributed by being positioned or located in a predetermined pattern using a template as described. The sheet may then be stamped, or pressed into desired tool shapes, which are heated to a temperature sufficient to bond the diamond particles to the matrix support material using the brazing alloy, as well as to sinter together the metal particles of the matrix. Such a process generally may be accomplished using low temperatures which do not incur many of the afore-warned risks to the tool.

The most widely used matrix powder for making diamond tools (e.g., saw segments) is cobalt powder. The standard sizes of cobalt powder for making conventional diamond tools are less than 2 micrometers. In the last decade, the diamond tool manufacturers have demanded finer and finer matrix powders. The commercial suppliers (e.g., Eurotungsten Co.) are therefore, moving toward making ultrafine (one micrometer), and even ultra-ultrafine (submicron) powders. With such a trend, the sintering temperature is continuously decreasing. A lower sintering temperature not only reduces the degradation of diamond; it also reduces the cost of manufacturing. For example, the powder consumption is lower. Moreover, the oxidation loss of graphite mold is also minimized.

The present invention, however, uses a diamond braze to fill up the pores of the matrix powder. Hence, coarse-sized powders, i.e. greater than 400 U.S. mesh or 34 microns, are preferred. Moreover, while conventional methods require the density be as high as possible so sintering can proceed rapidly, it is preferred in the present invention prefers to use a precursor with a lower packing density to allow the easy flow of the diamond braze. In fact, sometimes, the porosity of the precursor body may be intentionally increased by using irregularly shaped matrix particles. This preference, again, is contrary to the conventional wisdom that requires the particles be as spherical as possible so the packing density can be increased.

The use of a course matrix powder has other benefits. For example, a coarse powder can mix better with different compositions. Hence, the diamond grit may distribute more uniformly in the matrix. Moreover, a coarse powder has a smaller surface area, and hence, a lower frictional force for infiltration. Therefore, it can flow easier in the mold. Of course, a coarse matrix powder is also much less expensive, so the production cost may be reduced.

It is important to note that this invention utilizes the matrix merely as the network for holding the diamond grit in place. Hence, the matrix may not have to be made of powder. For example, the matrix body may be made of a piece of steel with openings that contain diamond grits of PCD bodies, such as that which is discussed below with respect to FIGS. 7A and 7B.

One important feature of the present invention for the purposes of various embodiments, is the selection of a diamond braze. Although there are numerous kinds of diamond brazes, only those that meet the following requirements are applicable. The infiltration temperature of the braze must not be so high as to cause significant diamond degradation. The temperature limit is, in general, about 1100° C. The infiltration temperature is typically 50° C. above the liquidus of the braze. A course matrix powder and a shorter infiltration path requires a lower excess temperature beyond the melting point of the braze.

The diamond braze must wet the diamond and chemically bond with the diamond. As discussed above, a carbide former dissolved in a suitable solvent alloy can meet this requirement. However, the reactivity of the carbide former must be balanced between diamond and oxygen or other gases such as nitrogen or hydrogen. It is a dilemma that strong carbide formers, such as titanium or zirconium that bond diamond well are also gas scavengers. They would react quickly with harmful gases in the ambient atmosphere before forming the carbide with diamond.

Most diamond tools are manufactured in a graphite mold often in air or in an inert gas. The minute amount of oxygen or moisture in the atmosphere may oxidize the carbide former so the latter may not bond to diamond. This is true even if the brazing is performed in a vacuum or in a hydrogen atmosphere, unless the vacuum is kept lower than $10^{-6}$ torr, or the dew point is kept below −60° C. Such a stringent requirement of vacuum or dew point often adds unnecessary cost to manufacturing.

On the other hand, if the reactivity is low, such as that of cobalt or nickel, the metal can be processed in graphite mold without being oxidized. However, it cannot bond to diamond either. Hence, there is a compromise for the carbide former between its ability to bond with diamond and its tendency to be oxidized.

In accordance with the present invention, it has been found that the preferred carbide former for the diamond braze is either chromium, manganese, silicon, titanium, aluminum and their alloys. The preferred total content of such carbide former is at least 3 percent, and more preferably at least 5 percent by weight. Examples of these brazes are NICROBRAZ LM (Ni—Cr—B—Si—Fe), manufactured by Wall Colmonoy Company (U.S.A.), with a melting range of 970–1000° C., and 21/80 (Cu—Mn—Ni), manufactured by Degussa (Germany), with a melting range of 970–990° C. Other possible brazes include: Cu—Mn alloy near the eutectic composition (about 25 wt % Mn) with a melting point of about 880° C.; Ni—Si alloy near the eutectic composition (about 50 wt % Si) with a melting point of about 970° C.; Cu—Si alloy near the eutectic composition (about 30 wt % Si) with a melting point of about 810° C.; Al—Si alloy near the eutectic composition (about 15 wt % Si) with a melting point of about 2600° C.

The above-recited examples of diamond brazes cover a wide range of mechanical properties and infiltration or sintering temperatures (generally about 50° C. above the liquidus). The alloys of them may also be used for further adjustments of infiltration temperature and mechanical properties. The selection of diamond braze depends on the intended application. In general, more severe applications, such as sawing granite, concrete, or asphalt) would require a stronger diamond grit that may tolerate a higher temperature of brazing. Brazes which melt at higher temperatures are, in general, more wear resistant. On the other hand, less demanding applications, such as sawing limestone or marble, require lower strength diamond grit. Such a diamond is degraded easily at high temperature so it must be brazed at a lower temperature. Brazes of this type are typically less wear resistant.

The sheets 100 may be first assembled to form the precursor of the tool segment and then hardened and finished using the infiltration and sintering techniques set forth above, or they can be hardened and finished individual, and subsequently assembled and combined to form the tool segment or the entire tool body where appropriate. Typically, the assembly of the sheets 100 is accomplished by a known method such as cold compaction with a press. The "green" body so formed can then be consolidated to form a final tool product by sintering or infiltration as described above.

While the method described in FIGS. 5A through 5D is preferred for many applications, there are instances where it is desirable to have the abrasive particles 20 extend outwardly from the sheet 100 of matrix support material. For example, some tools may only have one layer of abrasive. This can be accomplished simply by leaving the template 110 in place when performing the steps shown in FIGS. 5A and 5B, and not further pressing the particles 20 into the matrix support material once the template has been removed.

Figure 6A:
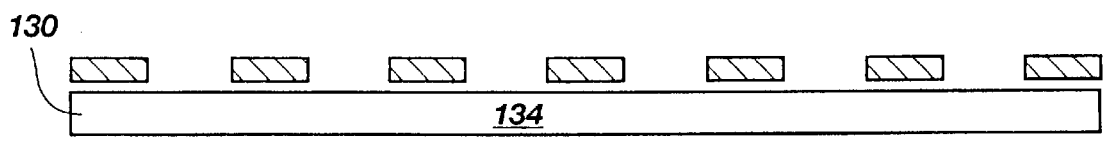
FIGS. 6A through 6C show an alternate method for forming one or more layers with controlled super abrasive distribution.
Figure 6B:
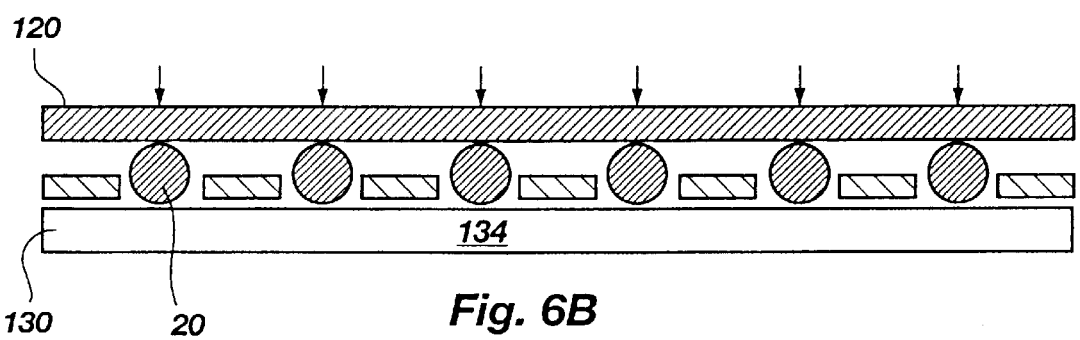
Figure 6C:
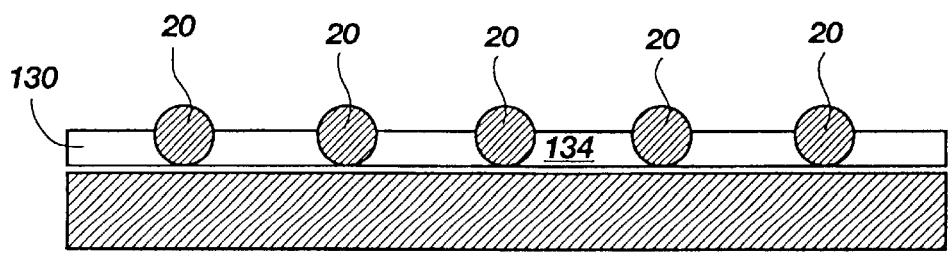

In the alternative, FIGS. 6A thorough 6C show a side view of an alternate to the method discussed in FIGS. 5A through 5D. The sheet 130 of matrix support material in FIGS. 6A through 6C is formed to be of a lesser thickness than the cross-sectional thickness or diameter or the super abrasive particles 20. When the particles or pressed into the sheet 130, the thickness of the sheet forces the particles 20 to protrude from the matrix support material 134. The sheet 130 is then infiltrated with diamond braze in the manner discussed above.

Also shown in FIGS. 6A through 6C is the principle that the spacing of the apertures in the template 130 need not be uniform. Rather, variations in spacing can be provided to facilitate different concentrations on various portions to facilitate different concentrations on various portions of the sheet 130 of matrix material 134. Likewise, by controlling the size of the apertures 138 and the order in which the diamond particles are placed in the apertures, a single layer could be provided with particles of different sizes.

While the use of the diamond braze 28 has been discussed with respect to the patterned distribution of diamond particles, it is equally applicable to the random distribution of diamond particles in a matrix support material. Once the diamonds have been placed in the matrix support material, a diamond braze comprising chromium, manganese, or silicon, and being substantially free of volatile metals, is melted and poured onto the matrix support material. The liquidus braze infiltrates the matrix support material and bonds the diamond particles to the matrix support material.

EXAMPLE 1

40/50 mesh diamond grit (SDA-85+ made by De Beers Company) were mixed with iron powders and an organic binder to form a mixture with diamond concentration of 20 (5% of total value). The mixture was cold pressed in a steel mold to form the shape of a saw segment. The precursor was placed in a graphite mold and overlaid with a powder of Nicrobraz LM. The mold was heated under vacuum to about 1,050° C. for 20 minutes.

The infiltrated braze had bonded diamond and matrix powder together for form a segment. Twenty-four of such segments were manufactured and they were trimmed to desirable tolerances. These segments were brazed onto a 14-inch round steel circular saw blade. The blade was used to cut granite at a faster cutting rate than was possible with conventional diamond saw blades. Additionally, the brazed saw blades had a longer useful life than a conventional diamond saw blade.

EXAMPLE 2

40/50 mesh diamond grit (SDA-85$^+$ made by De Beers Company) were mixed with metal powder to form a mixture with a diamond concentration of 20 (5% of total volume). Five different proportions of cobalt (about 1.5 micrometer in size) and bronze (about 20 micrometers in size) were used for the matrix powder. An acrylic binder was added (8% by weight) to the mixture and the charge was blended to form a cake. The cake was then rolled between two stainless steel rollers to form sheets with a thickness of 1 mm. These sheets were cut in the shape of saw segments with a length of 40 mm and width of 15 mm. Three each of such segments were assembled and placed into a typical graphite mold for making conventional diamond saw segments. The assembled segments were pressed and heated by passing electric current through the graphite mold. After sintering for three minutes, the segments were consolidated to a height of 9 mm with less then 1% porosity. Twenty-four segments for each composition were fabricated. They were brazed onto a circular saw of 14 inches in diameter. These five blades were used for cutting granites and found to perform equal or better than those with higher diamond concentrations (e.g. 23) made by conventional methods. Microscopic examination of the worn segment indicated that although diamond particles were not planted into the layered matrix, they were distributed more evenly than segments prepared by the traditional method. The segregation of particles in a layered matrix was considerably less than that in the thick body of conventional segments.

EXAMPLE 3

The same procedures were followed as Example 2, but with 8 thinner layers (0.4 mm) for each segment. The diamond concentration was reduced to 15 and particles were planted according to the illustration as shown in FIGS. 5A through 5D. The diamond distribution was much improved. As a result, the performance of these blades were equal or better than those made by conventional methods with diamond concentration of 20.

EXAMPLE 4

Iron powders of about 100 mesh were mixed with an S-binder made by Wall Colmonoy Company to form a cake. The cake was then rolled to form sheets of 0.4 mm in thickness. 40/50 mesh SDA-100$^+$ diamond grit was planted into these sheets to attain a concentration of 15. These diamond containing sheets were cut in the shape of saw segments with a length of 40 mm and width of 9 mm. Eight of such segments were assembled as a group and placed in a graphite mold. Twenty-four groups were placed horizontally, and another twenty-four groups were placed vertically in the graphite mold. Nicrobraz LM powder (−140 mesh) (made by Wall Colmonoy Company) was added on the top of these segments. These samples were heated in a vacuum furnace ($10^{-5}$ torr) to 1050 □C. for 20 minutes for horizontally placed segments, and 30 minutes for vertically placed segments. The melted LM alloy (Ni—Cr—B—Si with a liquidus point at 1000 □C.) infiltrated into these segments and filled the porosity. The excess LM braze on these segments were ground by electrode discharge (EDG). Each of the 24 segments so fabricated were brazed onto a 14 inch (diameter) circular saw blade. These blades were used to cut granite and showed marked improvement over conventional saw blades.

EXAMPLE 5

Nicrobraz LM powder was mixed with an acrylic binder and rolled to form layers of about 0.25 mm. 40/50 mesh MBS-960 diamond grit manufactured by General Electric Company was planted into these metal layers according to the method as illustrated in FIG. 5. These diamond planted metal layers were cut in proper size and wrapped around 2,000 beads (pearls) of wire saw. These beads (10 mm in diameter by 10 mm long) were divided into two groups, one contains 280 crystals (about 0.2 carat). These beads were heated in a vacuum furnace to a temperature of 1,000 □C. for 8 minutes. These beads were mounted on several wire saws and were used to cut marble, serpentine and granite. The performance of these beads was found to be superior to conventional beads. The latter beads were typically made by either hot pressing or electroplating. These conventional beads may contain a much higher amount of diamond (up to 1 carat) per bead.

EXAMPLE 6

The same method as described by Example 5, but applied to other products, e.g., circular saws, thin-wall core bits, and curvature grounder. Each of these products shows superior performance over conventional electro-plated diamond tools having similar superabrasive concentrations.

EXAMPLE 7

Mixture of metal powders that contain 87 wt % of −140 mesh Nicrobraz LM (made by Wall Colmonoy, U.S.), 8 wt % of iron of −125 mesh, and 5 wt % of copper of −60 mesh were mixed with 3 wt % of an acrylic binder to form a dough. The dough is rolled between two rollers to form sheets of 0.6 mm thick. Each sheet is cut to shape and covered with a template. 30/40 mesh (0.420 to 0.595 mm) diamond grits of SDA-100+ grade (made by De Beers, South Africa) were planted into the metal layers in a predetermined pattern with a diamond-to-diamond distance of about 2 mm. Three layers were stacked together and wrapped around a steel sleeve to form a diamond bead of 10 mm in diameter and 10 mm in length. These beads were heated in a vacuum furnace to consolidate the metal that also braze the diamond in place and onto the steel sleeve. 1,000 of such diamond beads were fitted over 5 mm steel cable that contained 7×19 wires, and they are spaced by plastic coating formed by injection molding. The wire was 25 meters long and it was joined end-to-end to form a loop. This wire saw was used to cut granite blocks (3.5 meter long by 1.8 meter high) of all grades. The life achieved was 0.5 square meter cut surface per diamond bead consumed (0.5 carat). This area cut is twice of that cut by conventional diamond beads made by a powder metallurgical method.

EXAMPLE 8

This is the same as example 7, except many diamond impregnated layers were assembled to form a block of 20 mm long by 5 mm thick by 7 mm high. These blocks were consolidated in a vacuum furnace to form diamond segments. Each segment contained about 8 volume percent diamond. 30 of such segments were brazed onto a 4 meter long steel frame and the fame was mounted on a reciprocating sawing machine. The saw was used to cut marble blocks with a life more than twice longer than conventional diamond segments produced by powder metallurgical methods.

EXAMPLE 9

This is the same as example 8, except the diamond planted layers were assembled to form segments of about 24 mm long by 3.5 mm thick for a core bits of 150 mm in diameter. The diamond content in these segments was about 4 V %. 10 of such core bits were used to drill concrete. The drilling speed and the life of these core bits were much higher than conventional diamond segments made by powder metallurgical methods.

EXAMPLE 10

This is the same as example 9, except the shape of segments is for circular saws. These segments were brazed to make circular saws of 230 mm (with 18 segments of 40 mm by 8.5 mm by 2.4 mm), 300 mm (with 21 segments of 50 mm by 8.5 mm by 2.8 mm), and 350 mm (with 24 segments of 50 mm by 8.5 mm by 3.2 mm) in diameter. These saws were used to cut granite, asphalt, and concrete with superior performance.

EXAMPLE 11

This is the same as Example 8, except the segments are used as dressers for conditioning grinding wheels.

EXAMPLE 12

A single layer of 14/16 mesh (1.4 mm to 1.2 mm in size) diamond grits (natural diamond EMB-S made by De Beers) planted sheet is covered over a pellet of 20 mm diameter by 8 mm thickness. Many of these pallets were brazed in a vacuum furnace. More than 3000 of such pallets were mounted on floor grinding machines to grind stone and wood floors. The results indicate that the grinding speed could be three times faster than conventional diamond grinders.

EXAMPLE 13

A single layer that contained planted diamond grits of 40/50 mesh (0.420–0.297 mm size) ISD 1700 grade (made by Iljin Diamond of Korea) was laid over the curved surface of a profile wheel and brazed to form a rigid tool in a vacuum furnace. More than 100 of such profile wheels of various diameters were used to form the edges of granite and marble slabs. These profile wheels were capable to cut more than 3 times faster than conventional diamond tools made by either electroplating or sintering method.

EXAMPLE 14

This is the same as example 13, except that the diamond planted layer is wrapped around a steel sleeve to form a single layered diamond beads. More than 100,000 of such beads were manufactured. They were used to cut granite or marble with superior performance.

EXAMPLE 15

This is the same as example 12, except the diamond grits were 80/100 mesh, and the diamond planted layer was used to cover the surface of a flat disk of 4 inches in diameter. 4 such disks were produced and used as conditioner to dress the CMP (chemical and mechanical polishing) pad that polished silicon wafers. The result indicated that the CMP efficiency was much improved and the conditioner outlasted conventional conditioners made by either electroplating or brazing.

EXAMPLE 16

Wall Colmonoy's Nicrobraz LM powder is used as the braze. It is mixed with either iron powder (Fe), copper powder (Cu), or both in various proportions (the following refer to the weight percentage of the overall mixture): 90 LM/10 SiC; 90 LM/10 WC; 100 LM; 92 LM/8 Fe; 90 LM/10 Cu; 82 LM/8 Fe/10 Cu; 80 LM/20 Cu; 72 LM/8 Fe/20 Cu; 70 LM/30 Cu; and 60 LM/40 Cu. The mixture also contains 4 weight percent of an acrylic binder that is used to glue all powder together. The mixture is cold pressed to form a sheet and heated to 400° C. for 30 minutes in air to burn out most of the organic binder. The preform is then placed in a vacuum oven maintained at a pressure of $10^{-5}$ torr. Heating is applied to a temperature of 1010° C. for 12 minutes. After the LM was completely melted and it infiltrated (or metal sintered by the aid of molten LM) the solid metal powder. After cooling the consolidated mass is taken out of the oven and tested for hardness and abrasion resistance. It was discovered that the HRB hardness for these compositions are 140, 130, 120, 118, 116, 110, 108, 100, 100, and 70, respectively. The abrasion resistance is decreases in the same order.

The hardness or abrasion resistance is important as it must match the wear rate of diamonds in a tool so the grit can be exposed to the proper height for cutting a work piece efficiently. When an abrasive material, such as diamond particles, is bonded to a soft matrix it may become over exposed. As a result, the abrasive material may be shattered or dislodged during the cutting action thus reducing the tool life.

It has been determined based on these experiments that diamond bonded on a 92 LM/8 Fe matrix is most suitable to cut hard materials such as concrete, granite, and sandstone. A 80 LM/20 Cu matrix is more suitable to cut softer materials such as limestone and marble.

Diamond grits of 30/40 mesh (SDA-100+ of De Beers Company) were mixed with an 80 LM/20 Cu matrix. Various cutting tools containing 30 concentration diamonds (about 8 volume percent) were produced. Tools included circular saw segments, gang saw segments, and wire saw beads which were then brazed to circular saw blades, reciprocatively cutting gang saw blades, and steel cables respectively. These tools were used to saw a variety of rocks with long lives and high cutting rates.

EXAMPLE 17

This is an example of sintering solid braze powder together without the melting step. LM powder was mixed with either Fe, Cu, or both in various proportions and an acrylic binder (4 weight percent) to form a dough. The dough is then rolled using steel rollers to form sheets 1 mm thick. 30/40 (18 concentration) and 40/50 (22 concentration) diamond grits of SDA-100+ were planted into these sheets using a template that contained holes of proper size in fixed positions. These sheets were cut to a size of 40 mm long by 8 mm wide. Five of these cut sheets were stacked together with three center layers that contained 30/40 mesh diamond. The assembly was hot pressed in a graphite mold at 400 atm and 900° C. After cooling, the segments were brazed onto circular steel blades. The blades with matrices containing 80 LM/20 Cu and 80 LM/10 Fe/10 Cu performed satisfactorily.

EXAMPLE 18

In this example single layer diamond forms are brazed directly onto the substrate for making a pad conditioner. LM powder is mixed with 4 weight percent of acrylic binder to form a malleable dough. The dough is rolled between two steel rolls to form a layer 0.2 mm thick. 80/90 mesh diamond grits of IMD-H as manufactured by Iljin Diamond Company was used to plant into the sheet. The planting was guided by a template that fixed the diamond to diamond distance as 0.7 mm. The diamond planted LM layer is then trimmed in size and glued using an organic binder to a flat stainless (316) plate 6.5 mm thick. The assembly is then heated in vacuum to 1010° C. for 10 minutes. The heating caused the LM to melt and bond to the substrate. The finished diamond disk is used as a pad conditioner that dressed the pad during the chemical and mechanical planarization (CMP) of silicon wafers. The result indicates that such diamond disk can double the life when compared to a conventional diamond disk that contains randomly distributed diamond grits.

A distinct advantage cutting tools of the present invention have over the prior art cutting tools lies in the manner in which the tool may be used. Diamond saws are typically made in the form of a circular blade that cuts the workpiece by rotation in the same direction with each rotation. This one directional movement causes a "tail" to be formed, wherein the matrix material rotationally forward of the diamond particle is worn away, but the matrix material behind the diamond particle is protected by the diamond particle. If the saw rotation were to be reversed, the diamond particle would easily be knocked free of the matrix.

Round saws, however, can only cut the work piece to a depth of less than one-half the diameter of the saw. In order to cut thicker workpieces, a frame or gang saw is typically used. Because these saws move reciprocally, the diamond particles must be securely held on each side. As a result, tails of diamond matrix cannot be maintained to hold the diamond particles in place. It is for this reason that reciprocating diamond saws have not been used to cut hard rock such as granite. Rather they are used to cut only soft materials such as marble.

This invention allows diamond to be held chemically by a braze. Hence, matrix tails are not needed to support the diamond. As a result, tools made according to the present invention can be used on reciprocating saws to cut hard materials. This breakthrough can expand diamond applications to markets, which were previously unavailable due to limitations of the prior art.

In addition to being able to improve the performance of the tool and to reduce the cost of manufacturing, this invention also provides an easier method for making thin bladed tools. For example, the electronic industry requires using larger and larger silicon wafers (now 12 inches in diameter). Hence, thinner saw blades for slicing silicon crystals, and thinner dicing wheels for grooving silicon chips with tighter partitions have been in great demand.

Prior to the present invention, it has been extremely difficult to make very thin tools that contain evenly distributed diamond particles. The present invention provides an alternative method for making such tools. For example, it has been discovered that by mixing micron powders of diamond, a blend of metal powders (e.g., bronze and cobalt) and a suitable binder, the material can be rolled to a thickness thinner than 0.1 mm—a thickness which is thinner than most dicing wheels. By firing this thin sheet and mounting it on a tool holder, a thin dicing wheel can be made.

In the alternative to the above, it has been found in accordance with the present invention that some of the advantages of the controlled distribution, multilayered superabrasive configurations described above can be achieved without the use of a template. More specifically, the abrasive particles can also be mixed in with the matrix powder and made as an ingredient of the layered sheet. In this case, the distribution of abrasive particles are still somewhat random. Even so, their distribution is typically more uniform than that in a conventional abrasive body. The segregation of abrasive particles and matrix powders discussed in the background section is less extensive in a substantially two-dimensional sheet than in a three-dimensional body. This is particularly true for sheets made by a deforming process (e.g., by rolling). In this case, abrasive particles are further spread out in the matrix by the shearing action of the rollers.

This invention may also be applicable to other applications not related to making abrasive tools. For example, graphite or metal sheets planted with diamond particles may be used as seeds for diamond growth under high pressure and temperature. Industrial diamonds are typically produced by compressing alternative layers of graphite and metal catalyst (e.g., Fe, Co, or Ni alloy) to high pressure and heating above the melting point of the catalyst. Diamond will then nucleate randomly on the interface of these layers. The quality of the diamond crystal formed often suffers by the impingement of growing crystals that are distributed unevenly. Hence, the yield and cost of diamond synthesis can be substantially improved by making the nuclei uniformly distributed. This invention can provide layers of either graphite or metal catalyst with a pre-determined pattern of diamond seeds. If organic binders are introduced during the fabrication of these layers, they can be removed by heating in a furnace before loading into the press.

Thus, there is disclosed an improved method for making diamond saw blades with improved performance. The above description and examples are intended only to illustrate certain potential uses of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance for scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The forgoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A method of making a superabrasive impregnated tool comprising the steps of:
   a) providing a matrix support material;
   b) locating a plurality of superabrasive particles at individually specified positions on a top surface of the matrix support material according to a predetermined pattern; and
   c) bonding the superabrasive particles to the matrix support material.

2. The method of claim 1, wherein the matrix support material comprises a brazing alloy containing between 2 and 50 weight percent of an element selected from the group consisting of: chromium, manganese, silicon, titanium, and aluminum.

3. The method of claim 2, wherein the matrix support material is provided as a metallic powder.

4. The method of claim 3, wherein the matrix support material further comprises an organic binder mixed with the metallic powder.

5. The method of claim 3, wherein the metallic powder has an average particle size of greater than about 400 mesh.

6. The method of claim 5, wherein the metallic powder contains irregularly shaped particles.

7. The method of claim 1, wherein the matrix support material consists of a brazing alloy containing between 2 and 50 weight percent of an element selected from the group consisting of: chromium, manganese, silicon, titanium, and aluminum.

8. The method of claim 2 or 7, wherein the brazing alloy is a diamond braze substantially free of zinc, lead, and tin.

9. The method of claim 2, wherein the brazing alloy includes at least 5 percent by weight of a carbide former selected from the group consisting of: chromium, manganese, titanium, silicon, and mixtures thereof.

10. The method of claim 2, wherein the brazing alloy further includes one or more members selected from the group consisting essentially of: boron, iron, copper, and nickel.

11. The method of claim 10, wherein the brazing alloy contains copper and manganese.

12. The method of claim 10, wherein the brazing alloy contains copper and silicon.

13. The method of claim 10, wherein the brazing alloy contains aluminum and silicon.

14. The method of claim 10, wherein the brazing alloy contains nickel and silicon.

15. The method of claim 10, wherein the brazing alloy contains copper and titanium.

16. The method of claim 10, wherein the brazing alloy contains titanium.

17. The method of claim 2, wherein the step of distributing superabrasive particles further comprises the steps of:
   placing a template having a plurality of apertures corresponding to the predetermined pattern upon a top surface of the matrix support material;
   filling the apertures with superabrasive particles;
   pressing the superabrasive particles into the matrix support material; and
   removing the template from the top surface of the matrix support material, such that the superabrasive particles remain embedded therein.

18. The method of claim 17, wherein the template is configured to hold one superabrasive particle in each aperture.

19. The method of claim 17, further comprising the step of:
   pressing said superabrasive particles to a greater depth in the matrix support material after removing the template.

20. The method of claim 2, wherein the step of distributing superabrasive particles further comprises the steps of:
   placing a template having a plurality of apertures corresponding to the predetermined pattern upon a transfer plate;
   filling said apertures with superabrasive particles;
   removing said template from said transfer plate; and
   pressing said transfer plate having the superabrasive particles thereon against the matrix support material, such that the superabrasive particles remain embedded in the matrix support material.

21. The method of claim 20, wherein said template is a sieve which is configured to hold one superabrasive particle in each aperture.

22. The method of claim 20, further comprising the step of affixing the superabrasive particles to said transfer plate using an adhesive.

23. The method of claim 22, wherein the superabrasive particles are embedded in the matrix support material and removed from said transfer plate using an adhesive coated on the support material which more strongly binds the superabrasive particles to the support material than to the transfer plate.

24. The method of claim 20, wherein said transfer plate is plastic.

25. The method of claim 20, wherein said transfer plate is transparent plastic.

26. The method of claim 1, wherein the predetermined pattern is a uniform grid pattern.

27. The method of claim 1, wherein the superabrasive particles are selected from the group consisting of diamond, cubic boron nitride, and mixtures thereof.

28. The method of claim 1, wherein the step of bonding further comprises the steps of:
  disposing a brazing alloy on the top surface of the matrix support material; and
  heating the brazing alloy and matrix support material to a temperature sufficient to allow the brazing alloy to infiltrate into the matrix support material, and bond the superabrasive particles thereto.

29. The method of claim 28, further comprising the step of subjecting the matrix support material and superabrasive particles to a vacuum of at least $10^{-3}$ torr during infiltration.

30. The method of claim 1, wherein the step of bonding further comprises the steps of:
  mixing a powdered form of a brazing alloy with the metallic powder of the matrix support material; and
  heating the brazing alloy and matrix support material to a temperature sufficient to bond the superabrasive particles to the matrix support material.

31. The method of claim 1, wherein the bonded matrix support material forms a single layer.

32. The method of claim 1, further comprising a plurality of layers formed from a matrix support material, each layer holding superabrasive particles, wherein the layers are bonded to one another to form a three-dimensional abrasive tool segment.

33. The method of claim 1, wherein said tool is a circular saw.

34. The method of claim 1, wherein said tool is a frame saw.

35. The method of claim 1, wherein said tool is a gang saw.

36. The method of claim 1, wherein said tool is a wire saw.

37. The method of claim 1, wherein said tool is a chain saw.

38. The method of claim 1, wherein said tool is a pad conditioner.

39. The method of claim 1, wherein said tool is a thin-walled cutoff saw.

40. The method of claim 1, wherein said tool is a dicing wheel.

41. A method of making a superabrasive impregnated tool comprising the steps of:
  a) mixing a metallic matrix support material powder having irregularly shaped particles with an average particle size of greater than about 400 mesh, with a brazing alloy powder, and an organic binder;
  b) placing a template having a plurality of apertures in a predetermined pattern upon a top surface of the mixture of matrix support material, distributing a plurality of superabrasive particles on a top surface of the matrix support material in a predetermined pattern said apertures being configured to hold one superabrasive particle each;
  c) removing the template; and
  d) binding the superabrasive particles to the matrix support material with a brazing alloy that contains between 2 and 50 percent of an element selected from the group consisting of chromium, manganese, silicon, titanium, and aluminum.

42. An abrasive tool consisting essentially of:
  a) a tool substrate;
  b) a plurality of superabrasive particles arranged at individually specified positions according to a predetermined pattern upon the tool substrate; and
  c) a brazing alloy which bonds the superabrasive particles to the substrate, said brazing alloy having at least two elements of at least 2 weight percent each selected from the group consisting of: chromium, manganese, silicon, aluminum, titanium, nickel, iron, cobalt, copper, and mixtures thereof.

43. An abrasive tool according to claim 42, wherein the brazing alloy contains between 2 and 50 percent of an element selected from the group consisting of chromium, manganese, silicon, titanium, aluminum, and mixtures thereof.

44. A method of making a superabrasive impregnated tool comprising the step of:
  bonding a plurality of superabrasive particles at individually specified positions to a substrate according to a predetermined pattern with a material consisting of a brazing alloy having at least two elements of at least 2 weight percent each consisting essentially of chromium, manganese, silicon, aluminum, titanium, nickel, iron, cobalt, copper, and mixtures thereof.

45. The method of claim 44, wherein the brazing alloy contains between 2 and 50 weight percent of an element selected from the group consisting of chromium, manganese, silicon, titanium, aluminum, and mixtures thereof.

* * * * *

US006679243C1

(12) EX PARTE REEXAMINATION CERTIFICATE (5664th)
United States Patent
Sung

(10) Number: US 6,679,243 C1
(45) Certificate Issued: Jan. 23, 2007

(54) BRAZED DIAMOND TOOLS AND METHODS FOR MAKING

(76) Inventor: Chien-Min Sung, No. 4, Lane 32, Chung-Cheng Rd., Tansui, Taipei County (TW), 23911

Reexamination Request:
No. 90/007,111, Jul. 7, 2004

Reexamination Certificate for:
Patent No.: 6,679,243
Issued: Jan. 20, 2004
Appl. No.: 09/935,204
Filed: Aug. 22, 2001

Related U.S. Application Data

(63) Continuation-in-part of application No. 09/399,573, filed on Sep. 20, 1999, now Pat. No. 6,286,498, which is a continuation-in-part of application No. 08/835,117, filed on Apr. 4, 1997, now Pat. No. 6,039,641, and a continuation-in-part of application No. 08/832,852, filed on Apr. 4, 1997, now abandoned.

(51) Int. Cl.
*B28D 1/02* (2006.01)

(52) U.S. Cl. .................. 125/12; 51/297; 451/529; 451/533; 451/544; 451/527

(58) Field of Classification Search .................. None
See application file for complete search history.

(56) References Cited

U.S. PATENT DOCUMENTS

| | | |
|---|---|---|
| 3,293,012 A | 12/1966 | Smiley et al. |
| 3,372,010 A | 3/1968 | Parsons |
| 4,908,046 A | 3/1990 | Wiand |
| 4,925,457 A | 5/1990 | deKok et al. |
| 4,943,488 A | 7/1990 | Sung et al. |
| 5,049,165 A | 9/1991 | Tselesin et al. |
| 5,380,390 A | 1/1995 | Tselesin et al. |
| 5,620,489 A | 4/1997 | Tselesin |
| 5,855,314 A | 1/1999 | Shiue et al. |
| 5,976,205 A | 11/1999 | Andrews et al. |
| 6,679,243 B2 | 1/2004 | Sung |

FOREIGN PATENT DOCUMENTS

WO    WO 95/27596    10/1995

OTHER PUBLICATIONS

Material Safety Data Sheet, Wall Colmonoy Corporation, prepared Jul. 20, 1989.

Kennametal Specification for DMHPM002 Hot Press Matrix N-50 (Dec. 6, 2001).

Material Safety Data Sheet, Kennametal (Jun. 11, 2004).

Endecotts Specifications, Keison Products (2004).

Colmonoy Technical Data Sheet No. DSP-1A (1993).

*Primary Examiner*—Bibhu Mohanty

(57) ABSTRACT

The present invention provides a superabrasive tools and methods for making the same. In one aspect, superabrasive particles are chemically bonded to a matrix support material according to a predetermined pattern by a braze alloy that contains Cr, Mn, Si, or Al or mixtures thereof.

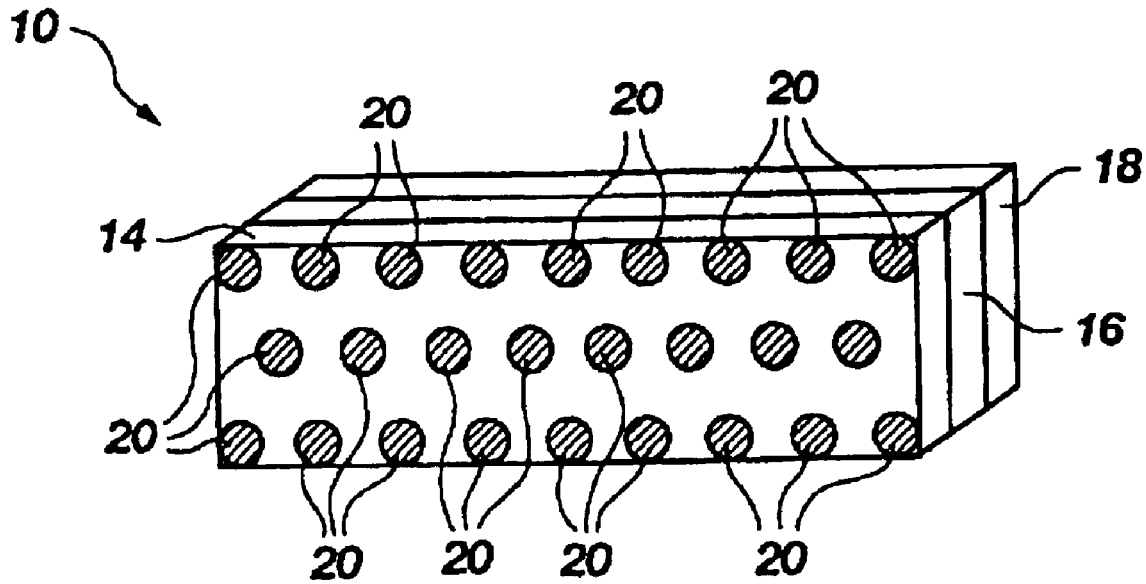

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 18 is cancelled.

Claims 1, 17, 20–21 and 41–44 are determined to be patentable as amended.

Claims 2–16, 19, 22–40 and 45, dependent on an amended claim, are determined to be patentable.

1. A method of making a superabrasive impregnated tool comprising the steps of:
    a) providing a matrix support material;
    b) locating a plurality of superabrasive particles at individually specified positions on a top surface of the matrix support material according to a predetermined pattern *using a template which is removed, said template including a plurality of apertures such that only one superabrasive particle is accommodated by each aperture*; and
    c) *then* bonding the superabrasive particles to the matrix support material.

17. The method of claim 2, wherein the step of distributing superabrasive particles further comprises the steps of:
    placing [a] *the* template [having a] *which has the* plurality of apertures corresponding to the predetermined pattern upon a top surface of the matrix support material;
    filling the apertures with superabrasive particles;
    pressing the superabrasive particles into the matrix support material; and
    removing the template from the top surface of the matrix support material, such that the superabrasive particles remain embedded therein.

20. The method of claim 2, wherein the step of distributing superabrasive particles further comprises the steps of:
    placing [a] *the* template [having a] *which has the* plurality of apertures corresponding to the predetermined pattern upon a transfer plate;
    filling said apertures with superabrasive particles;
    removing said template from said transfer plate; and
    pressing said transfer plate having the superabrasive particles thereon against the matrix support material, such that the superabrasive particles remain embedded in the matrix support material.

21. The method of claim 20, wherein said template is a sieve [which is configured to hold one superabrasive particle in each aperture].

41. A method of making a superabrasive impregnated tool comprising the steps of:
    a) mixing a metallic matrix support material powder having irregularly shaped particles with an average particle size of greater than about 400 mesh, with a brazing alloy powder, and an organic binder;
    b) placing a template having a plurality of apertures in a predetermined pattern upon a top surface of the mixture of matrix support material, distributing a plurality of superabrasive particles on a top surface of the matrix support material in a predetermined pattern said apertures being configured to hold *only* one superabrasive particle each;
    c) removing the template; and
    d) binding the superabrasive particles to the matrix support material with a brazing alloy that contains between 2 and 50 percent of an element selected from the group consisting of chromium, manganese, silicon, titanium, and aluminum.

42. An abrasive tool *precursor* consisting essentially of:
    a) a [tool substrate] *powder metal matrix support material including an optional organic binder*;
    b) a plurality of superabrasive particles arranged at individually specified positions according to a predetermined pattern upon the [tool substrate] *metal matrix support material*; and
    c) a brazing alloy which [bonds] *is capable of chemically bonding* the superabrasive particles to the [substrate] *metal matrix support material*, said brazing alloy having at least two elements of at least 2 weight percent each selected from the group consisting of: chromium, manganese, silicon, aluminum, titanium, nickel, iron, cobalt, copper, and mixtures thereof.

43. An abrasive tool *precursor* according to claim 42, wherein the brazing alloy contains between 2 and 50 percent of an element selected from the group consisting of chromium, manganese, silicon, titanium, aluminum, and mixtures therof.

44. A method of making a superabrasive impregnated tool comprising the step of:
    bonding a plurality of superabrasive particles at individually specified positions to a substrate according to a predetermined pattern with a material consisting of a brazing alloy having at least two elements of at least 2 weight percent each consisting essentially of chromium, manganese, silicon, aluminum, titanium, nickel, iron, cobalt, copper, and mixtures thereof, *wherein the predetermined pattern is formed using a template which is removed, said template having a plurality of apertures and each aperture being configured to hold only one superabrasive particle*.

* * * * *